United States Patent
Parr et al.

(10) Patent No.: US 11,349,561 B2
(45) Date of Patent: May 31, 2022

(54) LOW DATA VOLUME SATELLITE COMMUNICATION SYSTEM

(71) Applicant: eSat Global, Inc., Solana Beach, CA (US)

(72) Inventors: Michael Parr, Solana Beach, CA (US); Gary John Ballantyne, Christchurch (NZ)

(73) Assignee: eSat Global, Inc., Solana Beach, CA (US)

( * ) Notice: Subject to any disclaimer, the term of this patent is extended or adjusted under 35 U.S.C. 154(b) by 0 days.

(21) Appl. No.: 17/125,874

(22) Filed: Dec. 17, 2020

(65) Prior Publication Data

US 2021/0143903 A1    May 13, 2021

Related U.S. Application Data

(63) Continuation-in-part of application No. 16/714,671, filed on Dec. 13, 2019, now Pat. No. 11,115,116, which is a continuation-in-part of application No. 16/260,722, filed on Jan. 29, 2019, now Pat. No. 10,841,002, which is a continuation of application No. 15/683,645, filed on Aug. 22, 2017, now Pat. No. 10,193,616.

(60) Provisional application No. 62/949,755, filed on Dec. 18, 2019.

(51) Int. Cl.
*H04B 7/26* (2006.01)
*H04B 7/185* (2006.01)
*H04L 1/16* (2006.01)
*H04W 88/04* (2009.01)

(52) U.S. Cl.
CPC ....... *H04B 7/2656* (2013.01); *H04B 7/18513* (2013.01); *H04L 1/1692* (2013.01); *H04W 88/04* (2013.01)

(58) Field of Classification Search
CPC .. H04B 7/18513; H04B 7/2656; H04L 1/1692
USPC ............... 455/67.11, 452.1, 509; 370/329
See application file for complete search history.

(56) References Cited

U.S. PATENT DOCUMENTS

| | | | |
|---|---|---|---|
| 5,838,668 A | 11/1998 | Okada | |
| 7,187,926 B1 | 3/2007 | Henkel | |
| 8,817,603 B2 | 8/2014 | Houtman | |
| 2001/0052134 A1 | 12/2001 | Cunningham | |
| 2002/0168974 A1 | 11/2002 | Rosen | |
| 2006/0053436 A1 | 5/2006 | Allwein | |
| 2010/0098245 A1 | 4/2010 | Fang | |
| 2010/0122143 A1 | 5/2010 | Lee | |
| 2014/0119316 A1* | 5/2014 | Linden | H04L 5/0044 370/329 |
| 2015/0097727 A1 | 4/2015 | Ozaki | |
| 2016/0270109 A1* | 9/2016 | Jiang | H04W 72/1268 |
| 2017/0324508 A1* | 11/2017 | Vanninen | H04L 1/0003 |

(Continued)

*Primary Examiner* — John J Lee
(74) *Attorney, Agent, or Firm* — Innovation Law LLP

(57) ABSTRACT

Systems are disclosed for a communication system optimized for low data volume communications. In embodiments of the invention, a terminal in the communication system is configured to send and a receiver in the network infrastructure is configured to receive bursts containing pilot waveforms that include time spacing and/or phase changes between short sequences. The time spacing and/or phase changes can be selected to reduce out-of-phase autocorrelation and achieve robust performance.

26 Claims, 26 Drawing Sheets

(56) References Cited

U.S. PATENT DOCUMENTS

2018/0231666 A1* 8/2018 Lennen ................ G01S 19/426
2020/0119808 A1 4/2020 Parr

* cited by examiner

LOW DATA VOLUME SATELLITE COMMUNICATION SYSTEM

BACKGROUND

The present invention relates generally to the field of satellite communication systems. More specifically, the present invention relates to embodiments of satellite communication systems suited to low data volume communications.

A conventional Mobile Satellite System (MSS) can be configured to provide services, such as voice and packet data communication throughout the world. Referring now to FIG. 1, a typical MSS 100 comprises one or more geostationary satellites 102, one or more Gateway Stations (GS) 104, and one or more Satellite Terminals (ST) 106. The STs 106 can include mobile terminals (handsets), vehicle terminals, and/or fixed terminals. The GS 104 can be configured with external interfaces to existing fixed telecommunication infrastructure as well as to the wireless telecommunication infrastructure. For example, a GS 104 may interface to a Public Switched Telephone Network (PSTN) 108. The subsystems in gateways can be oriented to various types of transmission functionality, e.g., circuit-switched or packet-switched. The names of the subsystems vary between implementations. The term for all the ground-based subsystems is Network Infrastructure 110, which includes the GS and PSTN subsystems in FIG. 1. The satellite directs energy in the forward link to areas on the ground called beams 112. The same concept of beam-forming is applied in the return link to separately capture the signals from terminals in each beam at the satellite.

Information is communicated in finite duration transmissions called bursts. Bursts are composed of: waveforms related to physical layer functions such as detection and synchronization (e.g., pilot signals); and waveforms that contain modulated data. The modulated data includes payload fields and error detection fields (e.g., CRC). The payload fields may contain control information (such as terminal identity), and application-related information. Any payload information that is not application-related is defined as an overhead.

Information can be transmitted via these satellites 102 using a Common Air Interface (CAI). Existing satellite CAIs typically concentrate on efficient operation for relatively large quantities of data. For example, a voice call lasting one minute might involve 30 kB (kilo-Bytes) or more of information transmission in each direction. Packet data operations often involve even larger quantities of data, frequently in the MB (Mega-Byte) range. Providing a connection in a conventional MSS typically involves a sequence of steps including:

Requesting and establishing a link between a ST and network infrastructure via a satellite;
Exchanging information characterizing the capabilities of the end points;
Exchanging information describing the objectives and configuration of the connection;
Transmitting the data and related acknowledgements; and
Exchanging information to terminate the connection.

Prior to transferring information, a ST 106 typically must "register" with the network. In addition, the ST 106 typically must "re-register" when it moves from one satellite beam to another. When a ST 106 is registered, the network infrastructure is aware that the ST 106 is present and the beam 112 within which that ST 106 can be located. After a ST 106 is registered, data exchanges can proceed. A conventional MSS data exchange may start with establishing a communication channel. This may include sending a Random Access Channel (RACH) burst from a ST 106 to a satellite 102, which passes the RACH burst to a gateway 104. The RACH burst might include source information, such as a called party, terminal identity (ID), terminal capabilities, the message intent (such as establishing a packet connection) and possibly location information. Next an Access Grant Channel (AGCH) burst may be sent from the gateway 104 to the ST 106 to establish a bidirectional traffic channel for further exchange of information. A typical AGCH burst can provide other information, such as an indication of available resources for the ST 106. Security information may be exchanged back and forth between the gateway 104 and ST 106. Further capability information, such as maximum data rate, may also be exchanged between the gateway 104 and ST 106.

After a communication channel is established, data may be sent between the ST 106, satellite 102, and gateway 104. The data may be sent in multiple messages. Each message includes header and protocol overhead, which will vary in quantity depending on the scenario, and can amount to approximately 20% of the message. Acknowledgement messages (ACK) are also sent to acknowledge the successful receipt of the data messages. If, the data messages are not successfully received, a Non-Acknowledgement message (NACK) is sent and the data message(s) are resent.

After data communications are complete, the ST 106 will send a "done" message to the satellite 102 which gets passed on to the gateway 104 and, if the "done" message is successfully received, a termination message is sent to the ST 106 acknowledging receipt of the "done" message. For large quantities of data, the exchanges other than "transmitting the data", can correspond to a reasonable overhead. However, for smaller data exchanges, the overhead can significantly impact efficiency.

U.S. Pat. No. 10,193,616 (which is incorporated herein by reference) discloses a satellite communication system which is configured for applications which exchange a comparably low volume of data between the terminals and network infrastructure. In this system, much of the overhead associated with communications between terminals and network infrastructure is eliminated by configuring the terminals to transmit information in prescheduled bursts that are intended to communicate a complete message. In this manner, the overhead associated with establishing and terminating a connection between a terminal and network infrastructure is eliminated making the system much more efficient.

U.S. Pat. No. 10,841,002 (which is incorporated herein by reference) discloses a satellite communication system which includes both satellite and terrestrial communication paths between satellite terminals and network infrastructure. In this system, the satellite terminals use the same common air interface to send and receive messages either through a satellite or through a terrestrial hub regardless of the communication path to and/or from the network infrastructure without having to switch its common air interface.

Power control can be used for adjusting the signal quality at a receiver. Performance of a system (e.g., its capacity at given error rates) improves when the Signal-to-Noise Ratio (SNR) at the receivers is close to a threshold for all transmissions. When supporting sporadic transmission of small quantities of data, the design of power, timing, and frequency control can have different sensitivities to propagation and environmental conditions than those associated with more continuous modes of transmission.

In a conventional satellite communications system, power is adjusted based on on-going transmissions from a terminal. For example, the network may command an adjustment to a terminal's transmit power in response to each burst received. Power control is often applied in both directions (to and from a terminal). For satellite links using code division (i.e., simultaneous transmission with spread sequences) the terminal transmissions represent the more challenging direction for control. That is, simultaneous transmissions from a satellite to a terminal experience almost identical propagation conditions (e.g., fading and shadowing). In contrast, for the direction from multiple simultaneously transmitting terminals to a satellite, the propagation conditions are typically different for each signal. For the case of large numbers of near-continuously transmitted bursts, power control performance can be dominated by the on-going feedback that sets power based on recent experience. Errors in the initial transmission may be larger than average, but their impact is reduced in significance as more bursts are transmitted during a connection.

In systems, like those disclosed in U.S. Pat. Nos. 10,193,616 and 10,841,002, which communicate using a small number of bursts (typically only one burst), power control performance can be dominated by the ability of terminals to set the initial burst power accurately. Common power control methods used in conventional systems which utilize on-going feedback are not particularly well suited for applications which communicate using a single or very few bursts to communicate data.

U.S. Publication No. US-2020-0119808-A1 (which is incorporated herein by reference) discloses a satellite communication system in which beam shape information is used for calculating a satellite terminal's initial transmit power thus enabling better initial burst power accuracy. In embodiments of this system, the satellite terminal is configured to receive an information element having beam shape information which can be used for setting the terminal's initial transmit power. In this manner, improvements in power control for systems supporting sporadic transmissions of small quantities of data can be achieved.

In many communications systems, pilot signals can be used on the forward link for a variety of things such as supervisory, control, equalization, continuity, synchronization, and/or reference purposes. For example, prior to sending a burst message in systems supporting sporadic transmissions of small quantities of data from a satellite terminal to network infrastructure, the satellite terminal 106 can send a pilot waveform through the satellite 102 on to the gateway 104 receiver. Existing architectures that use waveform spreading (including those used in both communications systems and position estimation systems, e.g., GPS), often use consecutively transmitted Pilot signals. These waveforms can enable a combination of good detection performance and practical implementation complexity (at the receiver of the waveform).

A conventional Pilot sequence length of 1024 chips repeated 128 times during a burst could require correlation over those 1024 chips at each of, say, 300 frequency hypotheses. Alternatively, a correlation over the entire burst (131,072 chips) would require ~128 times higher complexity per correlation, and would also require ~128 times more frequency hypotheses, for a total factor of ~16,000 higher complexity. As is readily apparent, correlation in these situations can be extremely complex and waveform detection can require vast amounts of resources at the gateway 104 receiver. In addition, even if this were achievable, additional practical challenges could arise as there may not be sufficient phase coherency over the length of the burst.

To address some of the correlation challenges described above, repeated 'short sequence' Pilot waveforms can be used. With repeated transmission of a waveform such as a pilot signal, reception of that waveform can sometimes introduce ambiguities in the form of 'false detection' opportunities at integer multiples of the short sequence length, e.g., where 127 out of 128 sequences match. That is, when viewed over the entire length of a burst, the Pilot waveform can have poor autocorrelation. As such, a need exists for a pilot signal configuration that improves the detection performance of the pilot waveform while maintaining a reasonable complexity in the gateway receivers.

SUMMARY OF THE INVENTION

Embodiments of the present invention enable a combination of the use of short sequence pilot waveforms and low autocorrelation. One embodiment of the invention relates to a communication system in which bursts transmitted from terminals containing pilot waveforms include time spacing and/or phase changes between short sequences for enabling efficient communication of small messages. The time spacing and phase changes can be selected to improve the detection performance at the gateway receiver. In one embodiment, the phase changes are in 180 degree steps (i.e., inversion of the chips).

In another embodiment of the present invention, a communication terminal is adapted to send burst messages to network infrastructure having a receiver in a communication system. The terminal can include a transmitter configured to transmit the burst messages to the network infrastructure. The burst messages can include a pilot waveform comprising a series of repeated short sequences arranged in a manner to reduce out-of-phase autocorrelation at the network infrastructure receiver. The pilot waveform can include time spacing between the repeated short sequences, wherein a length of time of the time spacing between the repeated short sequences increases for each subsequent set of repeated short sequences.

The time spacing between the repeated short sequences can be left open such that the transmitter transmits no energy in the time spacing. Alternatively, the time spacing between the repeated short sequences can be filled in a number of ways. For example, non-integer offsets could be transmitted in the time spacing. In another example, the length of the pilot waveform with time spacing can be truncated to equal the length of the pilot waveform without time spacing and gaps between the repeated short sequences created by the time spacing can be back-filled with short sequences which are truncated from the pilot waveform with time spacing.

Alternatively, the pilot waveform can include phase inversion of the repeated short sequences. For example, the phase inversion could be set in any number of ways such as in 180 degree steps or in 90 degree steps. In addition, the pilot waveform could include both time spacing between the repeated short sequences and phase inversion of the repeated short sequences.

In still another embodiment, a gateway, in network infrastructure operating in a communication system, could be adapted to receive burst messages from a communication terminal through the communication system. The gateway can include a receiver configured to receive the burst messages from the communication terminal. The burst messages can include a pilot waveform comprising a series of repeated short sequences arranged in a manner to reduce autocorrelation at the receiver. The pilot waveform can include time spacing between the repeated short sequences. The pilot waveform can include time spacing between the repeated short sequences, wherein a length of time of the time spacing between the repeated short sequences increases for each subsequent set of repeated short sequences.

The time spacing between the repeated short sequences can be left open such that the receiver receives no energy in the time spacing. Alternatively, the time spacing between the repeated short sequences can be filled in a number of ways. For example, non-integer offsets could be received in the time spacing. In another example, the length of the pilot waveform with time spacing can be truncated to equal the length of the pilot waveform without time spacing and gaps between the repeated short sequences created by the time spacing can be back-filled with short sequences which are truncated from the pilot waveform with time spacing.

Alternatively, the pilot waveform can include phase inversion of the repeated short sequences. For example, the phase inversion could be set in any number of ways such as in 180 degree steps or in 90 degree steps. In addition, the pilot waveform could include both time spacing between the repeated short sequences and phase inversion of the repeated short sequences. Further features of the present invention, its nature and various advantages will be more apparent from the accompanying drawings and the following detailed description.

DETAILED DESCRIPTION OF THE PREFERRED EMBODIMENTS

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of or combination with some or all of the described or illustrated elements. Wherever convenient, the same reference numbers will be used throughout the drawings to refer to same or like parts.

Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Further, the present invention encompasses present and future known equivalents to the components referred to herein by way of illustration.

Embodiments of the subject invention can be configured to communicate small quantities of data much more efficiently than a conventional MSS. In one embodiment, information transmitted between terminals and network infrastructure is sent in bursts that are intended to communicate a complete message without all the overhead used in establishing and terminating a connection associated with convention satellite communication systems. The bursts are sent in predetermined formats, at predetermined times so that the identity of the terminal can be easily determined eliminating the need for much of the overhead of a conventional MSS.

Figure 1:
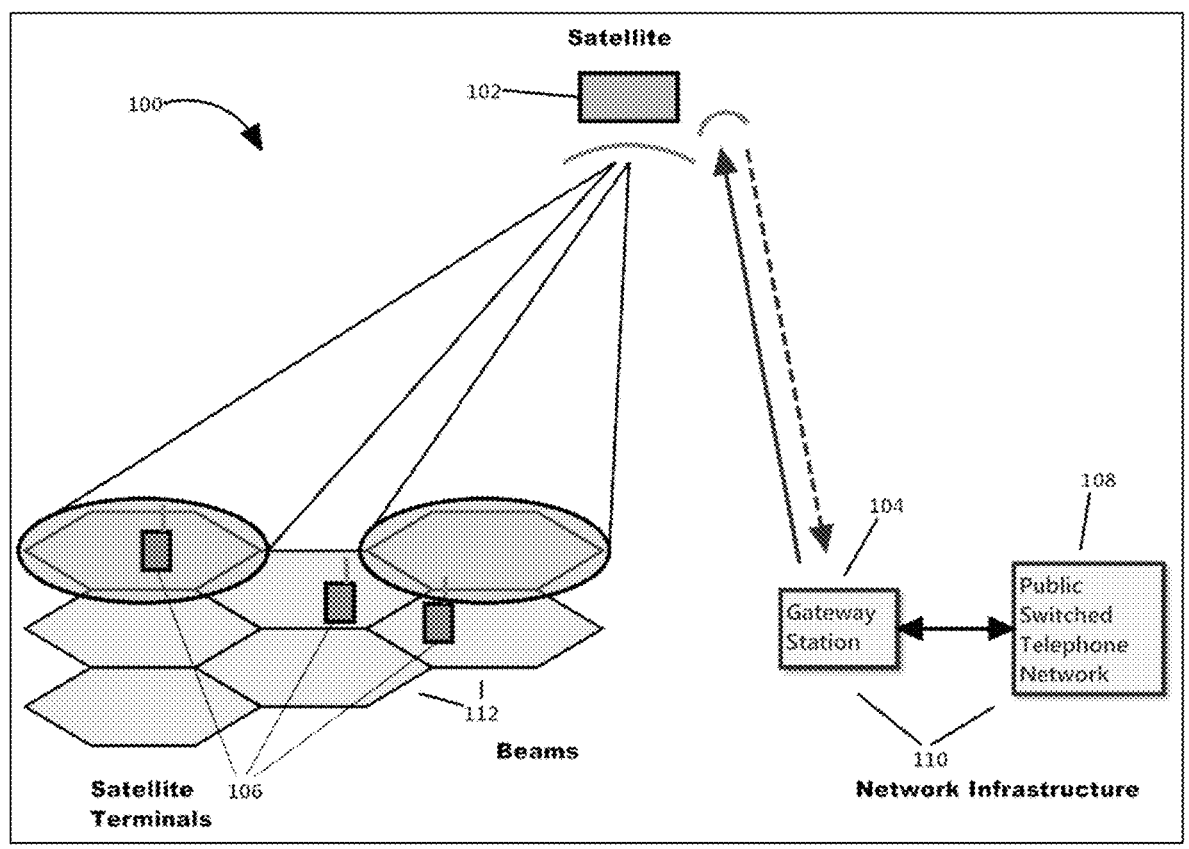
FIG. 1 is a schematic diagram of a conventional Mobile Satellite System (MSS).
Figure 2:
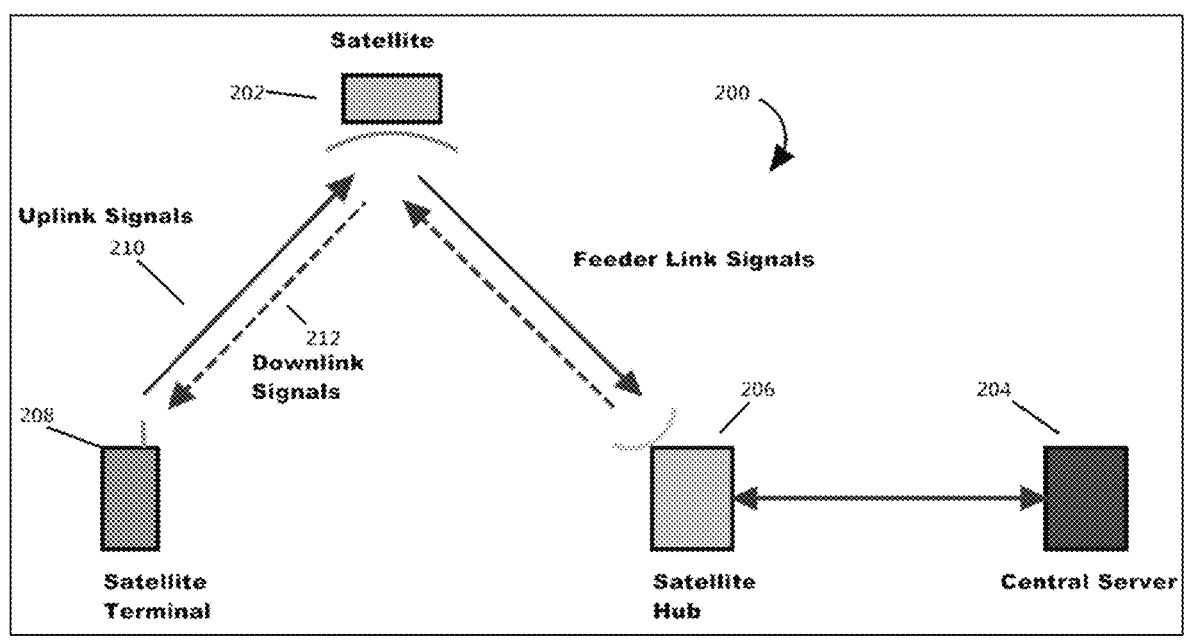
FIG. 2 is a schematic diagram of one embodiment of a satellite communication system according to the present invention.

As shown in FIG. 2, an exemplary low data volume satellite communication system 200 can comprise at least one satellite 202, at least one satellite terminal 208, and network infrastructure which can include at least one ground-based satellite hub 206, and a central server 204. Communication signals can be passed in both directions between the satellite 202 and satellite terminal 208 with uplink signals being sent from the satellite terminal 208 to the satellite 202 and downlink signals being sent from the satellite 202 to the satellite terminal 208. In fact, many satellite terminals 208 may be connected via each satellite link. The satellite 202 can also be configured to pass communications signals to and from the ground-based satellite hub 206 and the satellite hub 206 can be configured to pass data to and from the central server 204.

Figure 6:
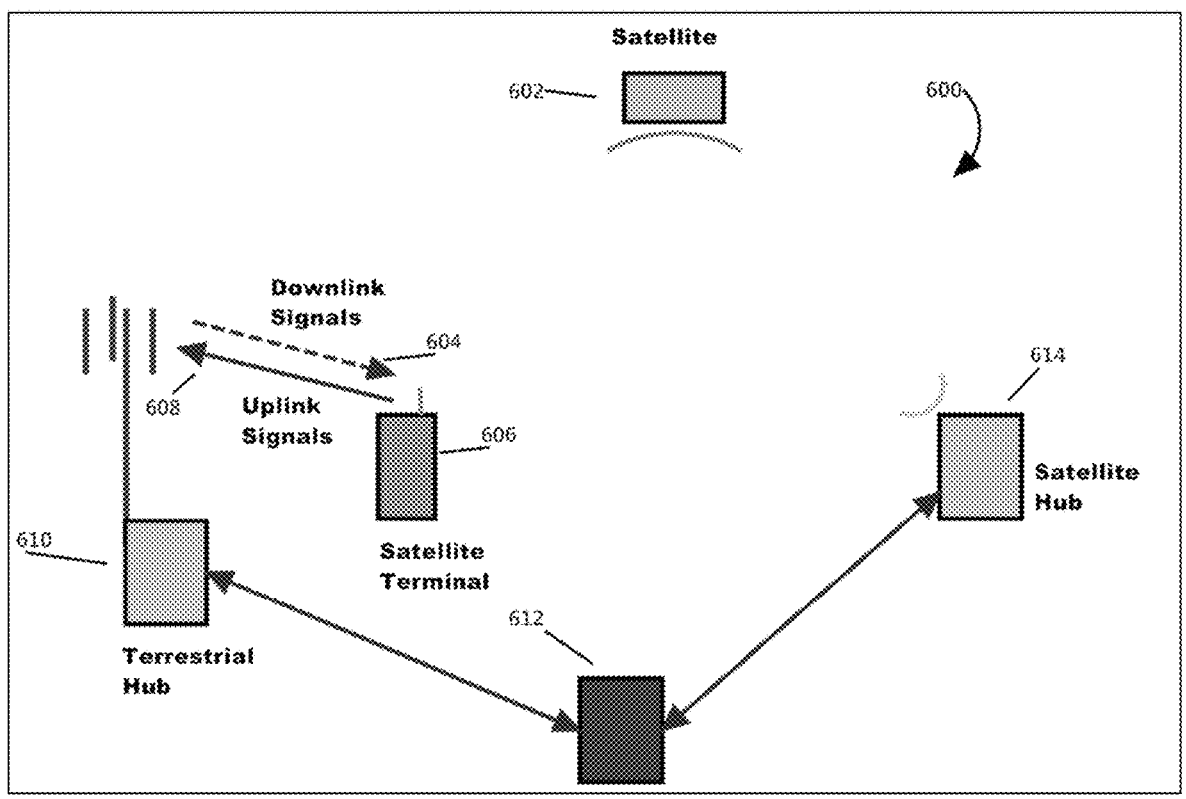
FIG. 6 is a schematic diagram of another embodiment of a satellite communication system according to the present invention showing an alternative communications arrangement with a terrestrial hub.

Satellite terminals 208 may comprise communications devices capable of transmitting information to, and receiving information from, network infrastructure via a satellite 202. Satellite terminals 612 may also be configured to communicate directly with network infrastructure as shown in FIG. 6, such as the ground-based terrestrial hub 610, using the same channels. Referring back to FIG. 2, downlink signals can be sent to a satellite terminal 208 using a forward link 212 and uplink signals transmitted from the satellite terminal 208 can be transmitted using a return link 210.

A satellite 202 can provide services across a set of channels within an area on the surface of the earth, or above it, called a beam. For example, within each beam, a forward link 212 Broadcast Control Channel (BCCH) can provide system information to satellite terminals 208. A pilot channel can provide a known waveform that enables detection of waveforms and a reference for demodulation of other bearers. A separate paging channel (PCH) can be used to transmit requests for connectivity to satellite terminal 208. ACK and power control channels can also be transmitted in the forward link 212 in response to bursts sent from satellite terminals 208. Traffic channels (TCH) can be used in both the forward 212 and return 210 links to convey payload information. A RACH can be used by the satellite terminals 208 to request establishment of a connection. Actual communication links can operate at different data rates. The lowest rate (which provides the highest link margin) can be supported by the most robust (or nominal) burst format.

Support for multiple networks, such as multiple satellite operators, and support for evolution to future networks can be included in embodiments of the invention. In one embodiment, this support can be implemented using the broadcast system information. The system information can be used to convey network information. As such, a terminal 208 may receive the information needed to operate in a different or new network via the system information. The system information can also be used to provide physical layer flexibility in a satellite terminal 208 via software-defined radio features in the satellite terminal 208. Satellite beam shape information can also be included in the system information which the terminals can use to set their initial burst transmit power and to estimate their position. Support for multiple data rates can also be provided. In one embodiment, different transfer rates can be configured by using Walsh codes to change the length of sequences used in information spreading, while all data rates share a common transmission structure so they can operate simultaneously.

Figure 3:
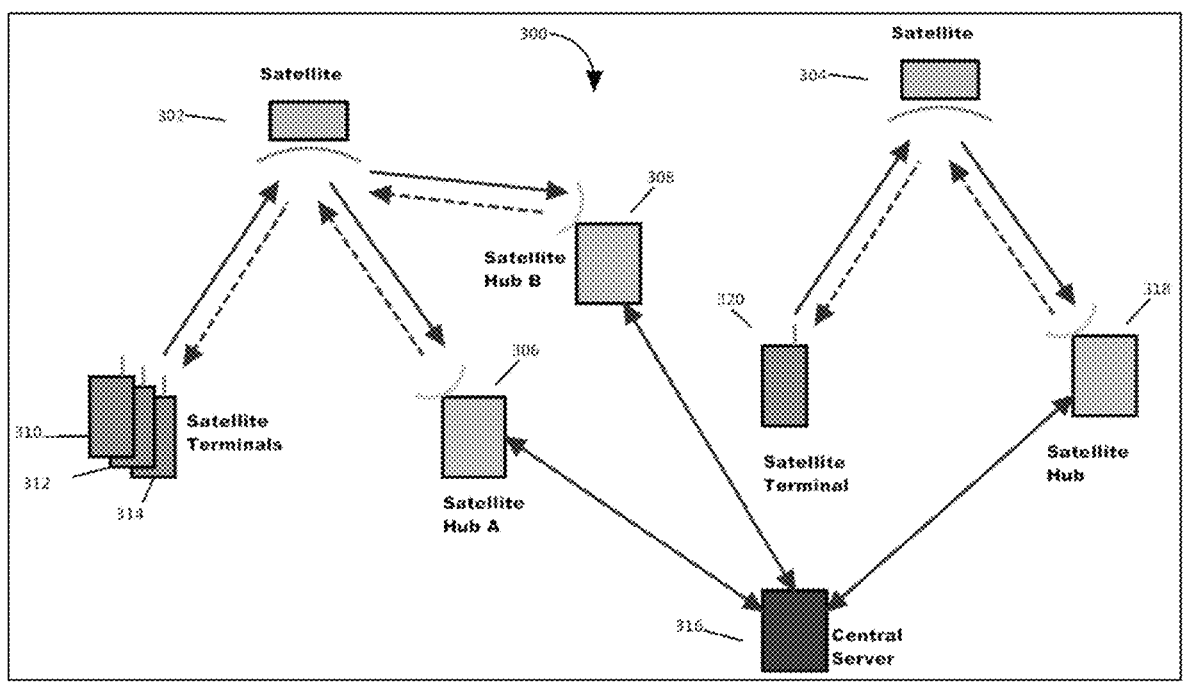
FIG. 3 is a schematic diagram of another embodiment of a satellite communication system according to the present invention showing multiple satellites in the communication system.

FIG. 3 illustrates another embodiment of the invention showing a network 300 with multiple satellites 302 and 304. Satellite 302 is configured to communicate with multiple satellite hubs 306, 308 and multiple satellite terminals 310, 312, 314. The satellite hubs 306, 308 are also configured to communicate with a central server 316. The central server 316 is also configured to communicate with satellite hub 318, which is connected to satellite 304. Satellite 304 is also connected to satellite terminal 320. As can be seen, the embodiment shown in FIG. 3 consists of a network 300 having several hubs 306, 308, 318 and several satellites 302, 304.

The communication links between satellite terminals and a satellite, for example, satellite terminals 310, 312, 314 and satellite 302, can use multiple sets of resources which can be characterized by a set of parameters. For example, the parameters could define carrier frequencies of all usable channels, chip rates, channel filtering, etc. When a fixed group of parameter settings is used in communication with a satellite, the associated link is termed a space relay. It is possible for multiple space relays (with different parameter settings) to operate over a single satellite. A set of space relays using the same parameter settings is usually termed a network. A system may contain multiple networks, where those networks could use different parameter settings.

Figure 26:
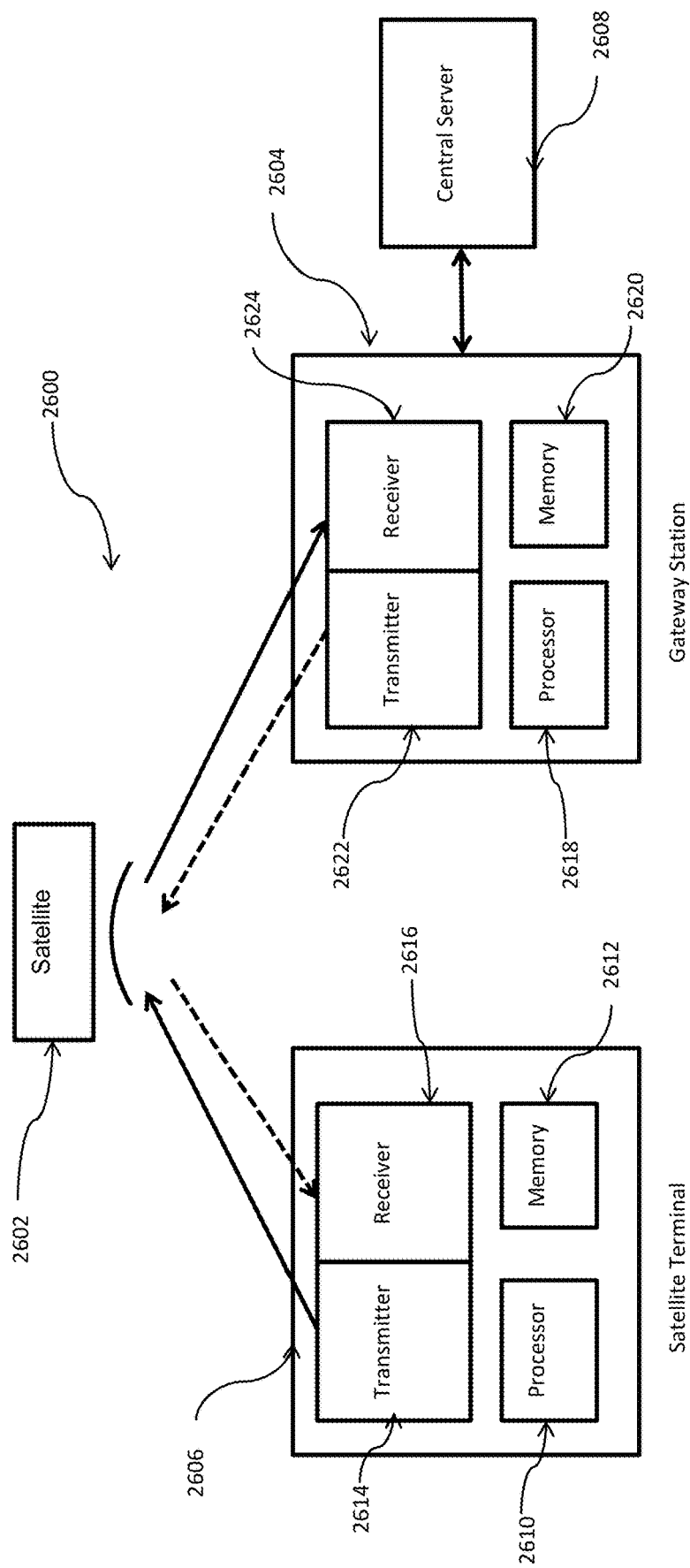
FIG. 26 is a schematic diagram of a satellite communication system according to the present invention showing some of the components of a satellite terminal and gateway station.

FIG. 26 illustrates some of the relevant components of a satellite terminal 2606 and gateway station 2604 in a communication system 2600. The communication system 2500 can comprise the satellite terminal 2606, satellite 2602, and network infrastructure including the gateway station 2604 and a central server 2608. As described herein, the satellite terminal 2606 is configured to communicate with the network infrastructure through a satellite 2602. The satellite terminal 2606 can comprise a processor 2610, memory 2612, and a transceiver having a transmitter 2614 and receiver 2616. The gateway station 2604 can also comprise a processor 2618, memory 2620, and a transceiver having a transmitter 2622 and a receiver 2624.

The satellite terminal transmitter 2614 is capable of transmitting burst messages through the satellite 2602 to the gateway station 2604 such that the burst messages are received by the gateway station receiver 2624. The gateway station transmitter 2622 is capable of transmitting various messages through the satellite 2602 to the satellite terminal 2606 such that the messages are received by the satellite terminal receiver 2616. The gateway station 2604 is also capable of communicating, either wirelessly or through a wired connection, with the central server 2608. Both the satellite terminal 2606 and gateway station 2604 have processors 2610 and 2618, respectively for controlling operation and memory 2612 and 2620, respectively for storing programs and information.

As mentioned briefly above, embodiments of the invention can be configured to communicate small quantities of data much more efficiently than a conventional MSS by transmitting information in prescheduled bursts that are intended to communicate a complete message without all the overhead used in establishing and terminating a connection associated with conventional satellite communications systems. The burst transmission configuration of embodiments of the subject invention, which is described in more detail below, provides enhanced transmission efficiency for low data volume communications in a satellite communication system. This 'scheduled transmissions' approach can be particularly useful in applications with regular reporting by satellite terminals established on a long-term basis, such as utility metering in which the satellite terminals monitor and report consumer utility usage.

In some embodiments of the invention, satellite terminal identities are not transmitted but are derived at the receiver based on the time of the burst arrival. The payload portions of bursts can be used to derive time-framing, reducing overhead such as specific synchronization channels. In the bursts transmitted by terminals, the Pilot waveform can be configured to provide strong autocorrelation properties that improve performance at the gateway receiver. It is also possible to avoid the exchange of capability information by mapping capabilities to the satellite terminal identity. Various embodiments can include efficient rescheduling of groups of timed transmissions to react to busy hour changes. The rescheduling of transmissions can be done based on pre-arranged alternative schedules which can be controlled via the broadcast system information. Also, power control suited to a low duty cycle and low overhead operation can be used.

Properly setting the initial bust power can be important in embodiments of the invention because the small data quantities exchanged in various embodiments does not usually provide for multiple continuous monitoring and adjusting of transmission power. As described in more detail herein, open loop power control methods can be used to set the initial burst power. The broadcast system information can be used to send the terminals beam shape information which, in turn, can be used to more accurately set the terminal's initial burst power. The satellite beam shape information can also be used by the terminal to estimate the terminal's position. In addition, improved terminal transmit timing and transmit frequency setting can be used to ensure that two over lapping bursts can be distinguished. By arranging Pilot waveforms such that the probability of detecting time-offset versions of bursts is low, i.e., autocorrelation is strong, the ambiguities during detection that could otherwise arise are reduced. These design features can be used to improve the performance of the system such that capacity is increased, error rates are reduced, and flexibility in the use of differing data rates is enhanced.

If GPS signals are being tracked, framing can be synchronized to GPS time enabling quicker synchronization. Enhanced margin operating options can also be included. For example, high priority communications, such as emergency calls, can be configured for transmit-only terminals which are not configured to receive satellite signals. Alternatively, paging to request a special format burst transmission can be configured where the special format trades the quantity of information within the burst for higher probability of detection. Higher forward link power may also be provided in pre-defined patterns with a low duty cycle thus enabling link-constrained terminals to receive forward link bearers at a low rate. Various additional features of embodiments of the invention can include acknowledgements with low average power based on zero power ACKs as described in more detail with reference to FIG. 9 and/or terrestrial expansion of service as described in more detail below. Terrestrial expansion can include enabling satellite terminals to receive transmissions from satellites but to transmit to local receivers on the ground enabling higher throughput for scheduled reporting, etc. Alternatively, or in addition, hub equipment can be configured to perform both transmission and reception. Frequency shifting relays can also be used. These relays can be primarily aimed at reaching heavily shadowed terminals such as terminals with an obstructed view of the satellite.

One exemplary implementation of an embodiment of a burst message which uses a robust format is described herein (in terms of the number of information bits, etc.) using a particular network configuration. This description of such an exemplary implementation addresses the modulation of payload information. Other elements of transmitted waveforms can include: pilot, acknowledgement, and power setting communications. For the purposes of this explanation, bursts can be described as transmitted waveforms communicating information.

In one embodiment, a burst can be formed as follows:
Input contains 112 payload information bits;
An appended 16-bit Cyclic Redundancy Code (CRC) yielding 128 uncoded bits;
Error correction coding, at rate ¼, yielding 512 coded bits;
Each coded bit can be spread using a 256 bit Walsh code, yielding a total burst length of $2^{17}$ bits;
A 1024 bit Gold code can be combined (in this case via an XOR function) with groups of 4 coded bits (each spread by a 256 bit Walsh code), wherein each such group has the duration of a timeslot. Each quarter of a timeslot, associated with a Walsh code, is called a symbol. That is, each coded bit corresponds to a symbol. There can be 128 timeslots and 512 symbols in each burst;
Each of the $2^{17}$ bits in a burst can be transmitted as a chip (i.e. a filtered waveform) with time spacing (from chip-to-chip), of a chip period; and
The time taken to transmit $2^{17}$ chips is a frame.

The timing of bursts transmitted by terminals can be defined in terms of return transmit slots, which are times within frames that are identified by return transmit slot indices. The times are selected to provide good performance in reception of the bursts. More specifically, the defined times reduce the probability of simultaneous reception of bursts from different terminals that are aligned in timeslots. The sequence in which chips are transmitted within the bursts transmitted by terminals can be set such that the probability of simultaneous reception of bursts from different terminals with any time offset is low, i.e., the peak of the autocorrelation over the entire burst is significantly higher than with any other time offset. In one embodiment, an exemplary network configuration can include the following parameters:

Forward Link Carrier Frequencies and numbering (Absolute Radio Frequency Channel Number or "ARFCN");
Chip Rate;
Filter characteristics, e.g. Roll-Off factor of Square-Root Raised Cosine; and
Frame Reference to enable time definition.

Sample parameter values in one exemplary embodiment can be set as follows:
Forward carrier frequencies at 1,525,000,000+31,250*N; where $1 \leq N \leq 1,087$
Chip Rate=23,400 cps
Roll-Off Factor=0.35
Frame Reference based on GPS time, starting at a particular date and time, e.g. UTC (midnight) of Jan. $1^{st}$ to $2^{nd}$ 2017.

The 512 coded bits transmitted can each be associated with a 256-bit Walsh coded sequence. Each Walsh coded sequence can be selected from one of 256 possibilities, each defined by a Walsh Code Index. Selection of the Walsh codes can give a degree of freedom in the design of a system. For example, the set of Walsh codes used for transmission of BCCH channels can be a key to Forward Link synchronization. As mentioned above, conventional satellite communications systems typically do not have air interface capabilities of the type described herein with respect to various embodiments of the invention, which are capable of communicating a complete message without establishing a connection involving several or many burst transmissions.

Scheduled transmissions can be a key capability in various embodiments of the invention. The following description outlines various embodiments of scheduled transmission establishment and execution.

During terminal registration, the central server could establish scheduled transmissions to be performed by that terminal. The following set of parameters provides an example of the information that may passed to the terminal. In one embodiment, 54 bits of transmitted information consist of 3 parameters and the combination of these parameters can be called an Information Element. For example, Information Element TI_IE_Sched_TX_Config can comprise parameters TI_ELMT_Sched_TX_First_Frame, TI_ELMT_Sched_TX_Frame_Incr, and TI_ELMT_Sched_TX_Timeslot. TI_ELMT_Sched_TX_First_Frame can comprise 23 bits, TI_ELMT_Sched_TX_Frame_Incr can comprise 23 bits, and TI_ELMT_Sched_TX_Timeslot can comprise 8 bits. The first element, TI_ELMT_Sched_TX_First_Frame, can define the 23 Least Significant Bits (LSBs) of the frame number of the first transmission (e.g., it can have a range of ~543 days if the chip rate is 23.4 kcps). The second element, TI_ELMT_Sched_TX_Frame_Incr, can define the number of frames between transmissions (which can also have a range of ~543 days if the chip rate is 23.4 kcps). The third element, TI_ELMT_Sched_TX_Timeslot, can define on which of the timeslots within the selected frame the terminal should begin transmission.

Figure 12:
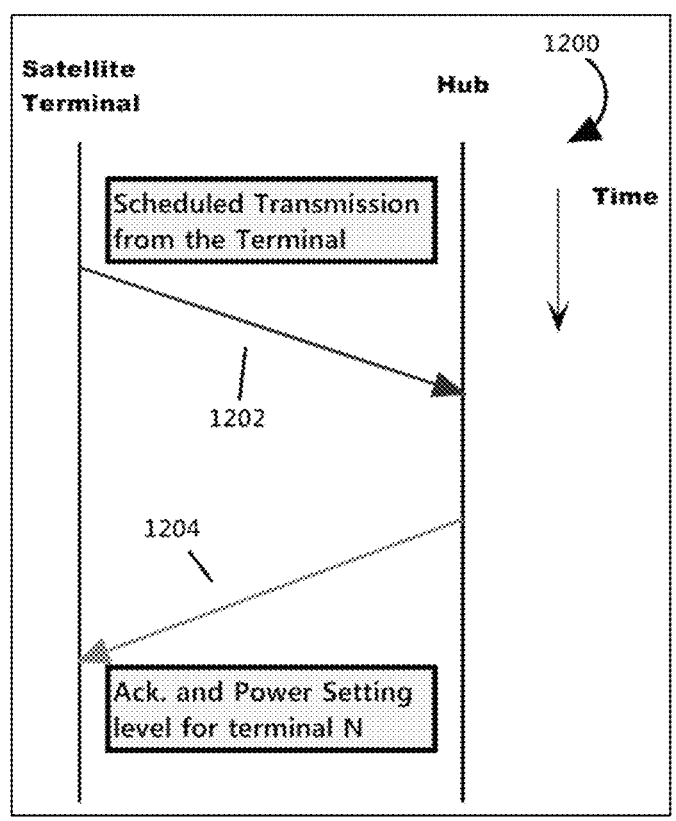
FIG. 12 is a schematic diagram showing the protocol associated with a successful scheduled transmission according to one embodiment of the subject invention.

The assignments of frames and timeslots can be arranged to ensure that each terminal has a unique transmission start time. For example, when the time of the first scheduled transmission is approaching (perhaps 100 seconds beforehand), the terminal can acquire and then receive the forward link control channel, the BCCH. The terminal can then read some of the content of the System Information to determine whether it should proceed with the scheduled transmission. That is, the terminal can check that channel quietening is not active and that transmission is enabled. The terminal can also read other System Information related to determining the terminal's initial burst transmit power. The terminal may then execute a protocol that begins with transmission of the scheduled transmission burst 1202, as shown in FIG. 12. As the transmission time approaches (perhaps a few seconds beforehand), the terminal can determine the appropriate initial burst transmit power, prepare the burst for transmission, and the associated real-time control registers can be programmed to enable the transmission to begin. Then, at the selected transmission time, the burst can be transmitted. As shown in FIG. 12, the terminal will then receive a burst 1204 from the hub. If that burst contains an ACK indication, then the protocol will end, and the terminal will return to a dormant state and wait for the next scheduled transmission. If a NACK indication is received, then the terminal will retransmit the burst at a pre-defined retransmission time. Retransmissions will continue until an allowed maximum number of retries is reached.

Figure 13:
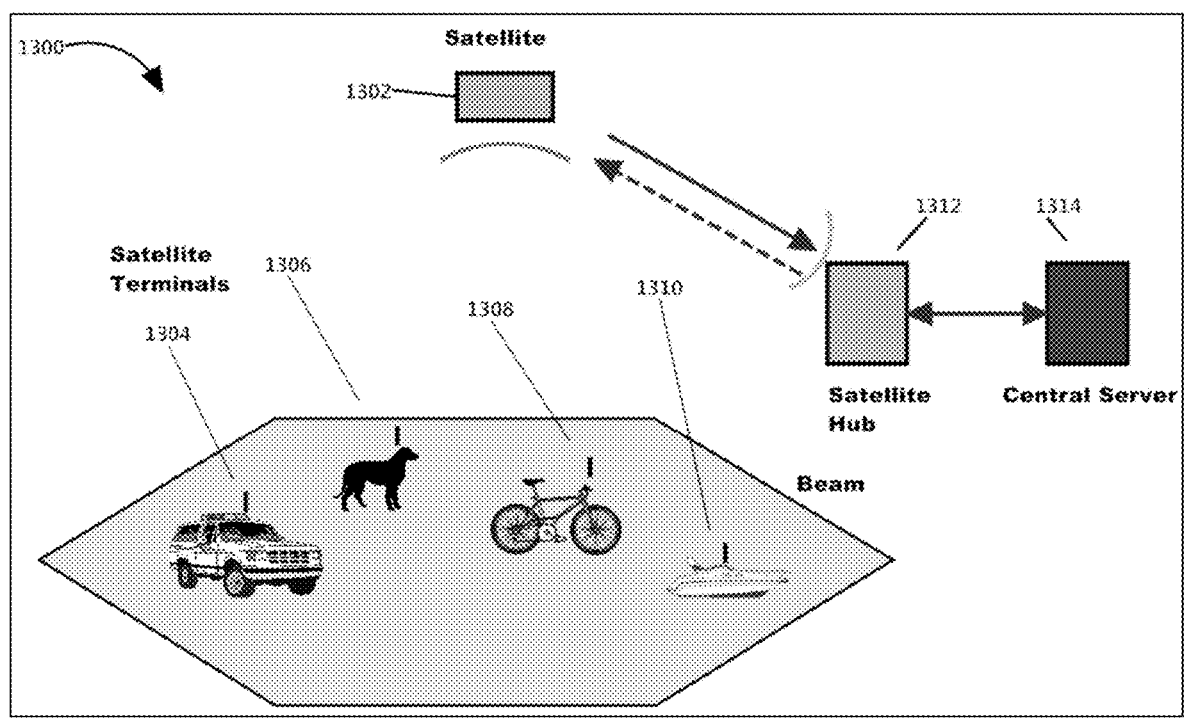
FIG. 13 is a schematic diagram showing several terminals in a beam where each terminal executes scheduled transmissions according to one embodiment of the subject invention.
Figure 15:
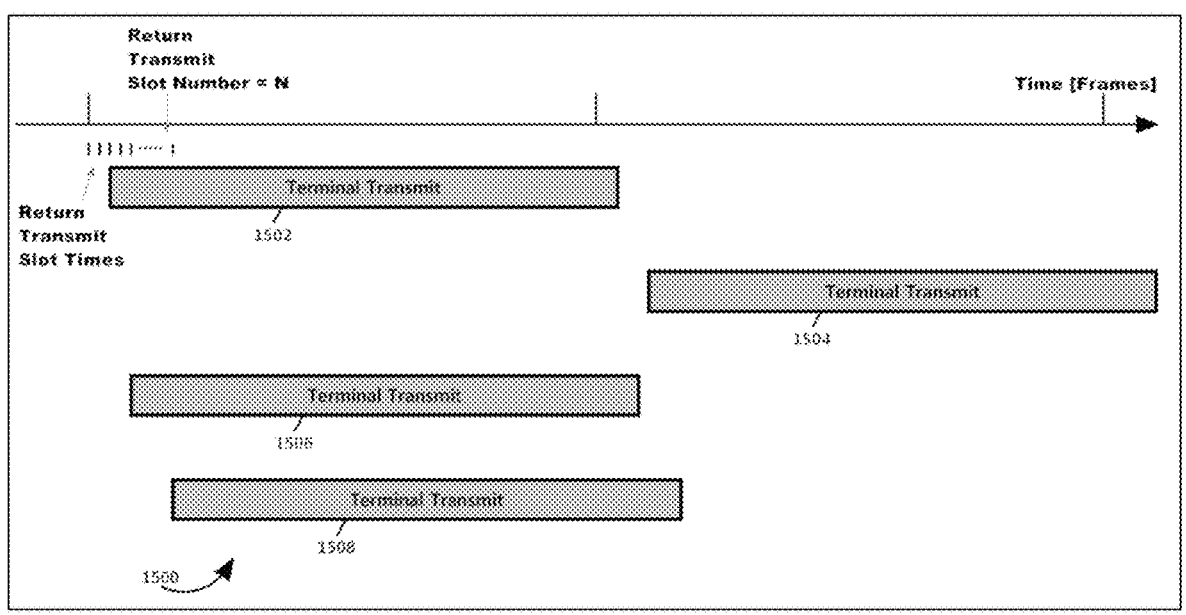
FIG. 15 is a schematic diagram showing the timing of bursts transmissions from multiple terminals with scheduled transmissions according to one embodiment of the subject invention.

FIG. 13 illustrates one embodiment of the subject invention in which multiple terminals, located in the same beam, execute scheduled transmissions. Terminals located in beams other than the one illustrated here may use different Gold sequences and thus are typically not seen by Hub 1312. The four terminals 1304, 1306, 1308, 1310 can be assigned different transmit times as illustrated in FIG. 15. The TI_IE_Sched_TX_Config Information Element can be used to assign the different scheduled transmission times for bursts 1502, 1504, 1506, and 1508. As shown in FIG. 13, terminal 1304 can be a mobile terminal attached to a moving vehicle, terminal 1306 can be a mobile terminal attached to a house pet, terminal 1308 can be a mobile terminal attached to a bicycle, and terminal 1310 can be a mobile terminal attached to a boat. The terminals 1304, 1306, 1308, 1310 can be configured to send burst messages to the network infrastructure (satellite hub 1312 and central server 1314) through the satellite 1302 at different pre-determined times such that the network infrastructure can match up the burst messages with the sending terminal based on the time of reception of the burst message at the network infrastructure. In this way, message overhead can be reduced because terminal identity information as well as other overhead typically found in a conventional communication system, is not needed. The bursts transmitted by the various terminals may be configured to achieve low autocorrelation based on the insertion of time spacing and phase offsets.

Figure 14:
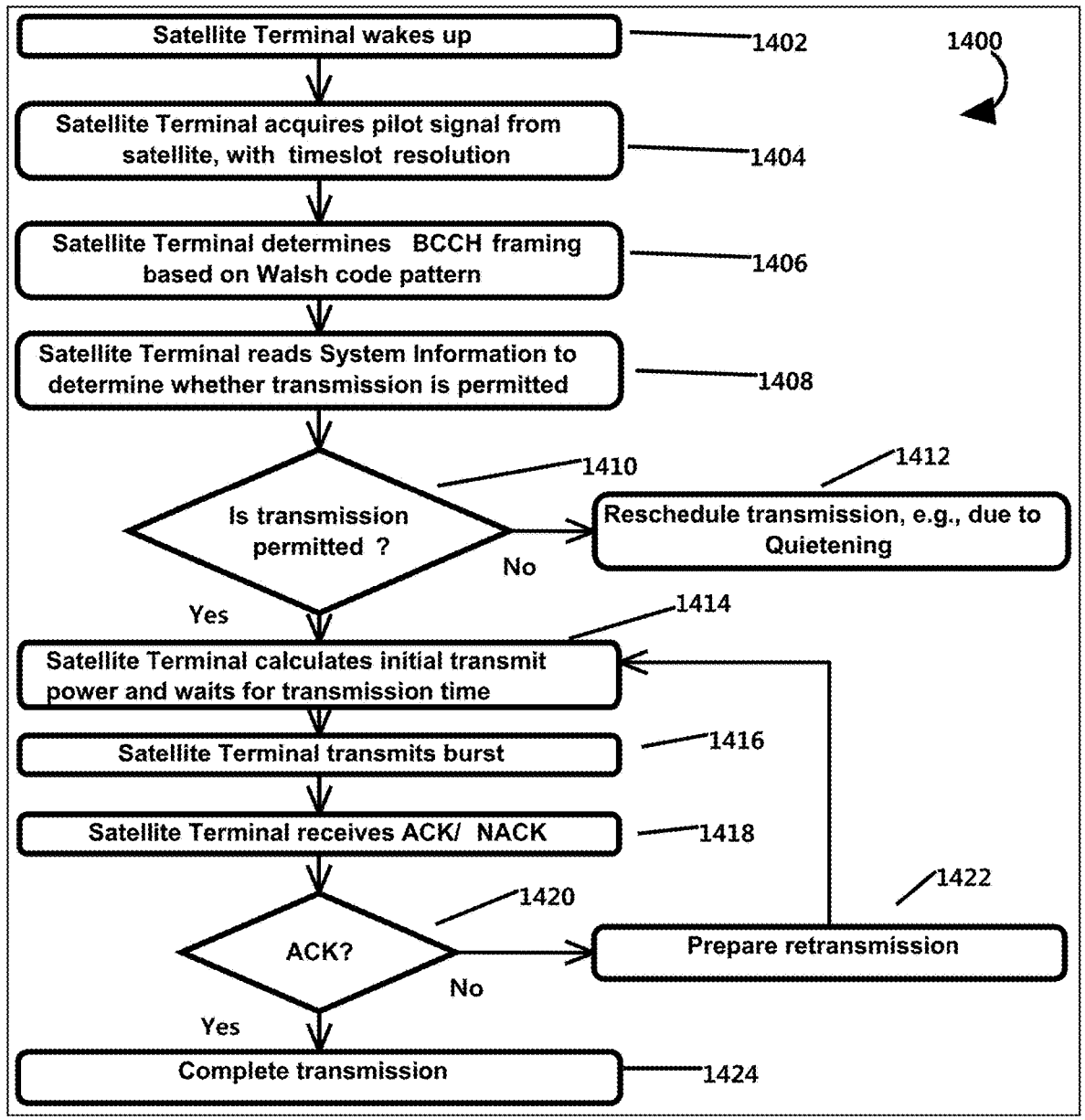
FIG. 14 is a flow chart illustrating an exemplary scheduled transmission as seen by a terminal.

FIG. 14 illustrates an exemplary scheduled transmission process for a terminal according to one embodiment of the invention. Each terminal in a system can implement scheduled transmissions as shown in FIG. 14. According to FIG. 14, the terminal first wakes up 1402, then acquires the pilot waveform 1404 resulting in resolution of timeslot boundaries. Burst framing can be determined by the terminal based on Walsh code sequences associated with the BCCH 1406. The terminal then reads the System Information 1408 and, based on the content of the System Information, the terminal can determine whether to proceed 1410 with the scheduled transmission, or to reschedule for a later time 1412. It should be noted that a version number can be associated with the System Information. In this manner, it is possible for the terminal to check the version number of the System Information and, if it matches the version number of System Information previously read and stored by the terminal, the terminal can use the stored System Information instead of using bandwidth to re-read the System Information. If it is determined that the transmission should proceed, the terminal will calculate the initial burst transmit power and wait for the assigned time 1414 and then transmit the burst 1416 at the scheduled time using the calculated initial burst transmit power. After transmission, the terminal will receive an acknowledgement (ACK or NACK) 1418. The terminal checks the acknowledgement message 1420 to determine whether it is an ACK or NACK message. In the event an ACK is received, the scheduled transmission will be completed 1424 and the terminal will go back to sleep. If a NACK is received, the terminal will prepare to retransmit the burst 1422 (which includes raising the power by a parameterized number of dB's as described more fully herein), and then repeat the transmission and acknowledgement steps 1414, 1416, 1418, 1420 until the burst is successfully transmitted.

The maximum number of retransmission attempts can be limited by a parameter that can be delivered via System Information. The hub receiver can be configured to receive transmitted bursts from each of the four terminals. The spreading codes (Gold and Walsh) can be used to enable the separate reception of each burst. These bursts may overlap in time. Low autocorrelation of the spreading sequences can enable reception of bursts which overlap in time. Low autocorrelation can be implemented using time shifting and phase offsets between timeslots. The time at which the bursts are received depends on the transmission time and the length of the signal paths. The maximum difference in signal delay across a beam is usually less than the difference between the assigned transmission times. Signal delay can arise both in the forward link, from which the terminal derives its time reference, and the return link, through which the transmission passes. As a result, the arrival time of each burst can be unambiguously mapped to the source terminal.

Figure 4:
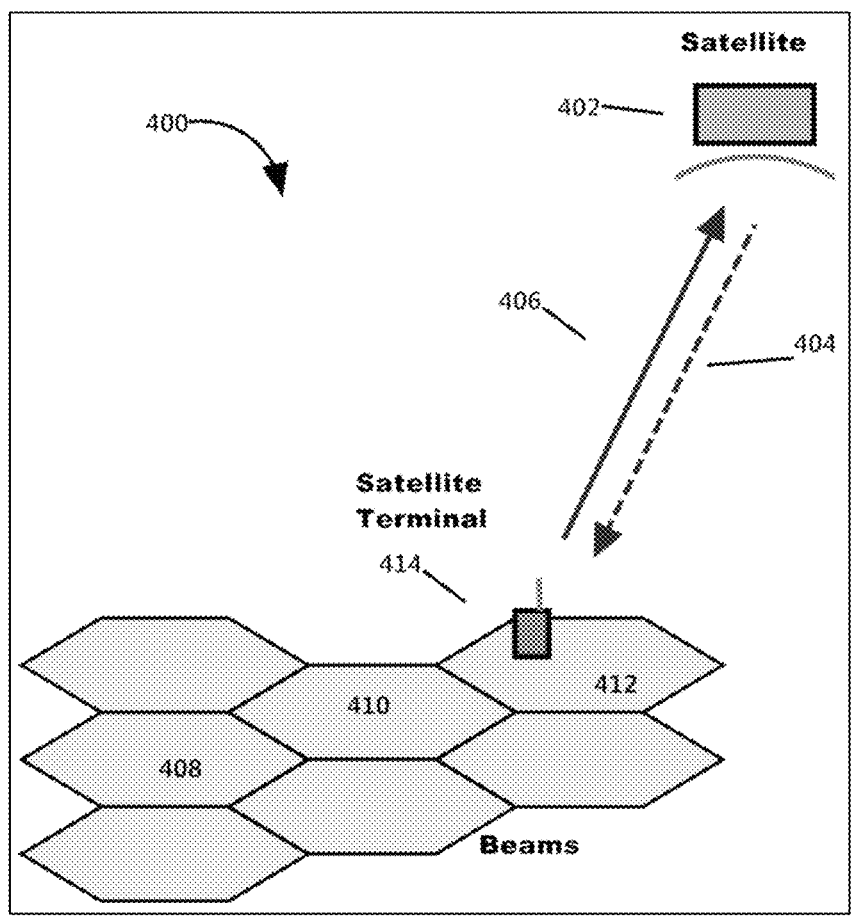
FIG. 4 is a schematic diagram of a satellite communication system according to the present invention showing satellite beams formed on the Earth's surface.

MSS satellites, potentially in combination with ground-based facilities, can generate beams enabling communication in the forward (satellite-to-terminal) and return (terminal-to-satellite) directions. In typical forward link implementations, a phased array of emitters at the satellite transmits power that is reflected by large antenna (with a width of tens of meters). In the return link, a phased array of receiver elements forms similar beams. As shown in FIG. 4, in an exemplary satellite communication system 400, a satellite 402 may provide communication links to areas on the Earth's surface. Using a beam former, the satellite 402 can direct signals 404 to areas on the ground, for example, creating beams 408, 410, 412. A typical satellite 402 can create hundreds of beams, where each beam is hundreds of kilometers in diameter. Within a beam, multiple carrier frequencies may provide connectivity (in each direction 404, 406). Neighboring beams (such as 408 and 410) can use the same carrier frequency. A satellite terminal 414 within a beam 412 can be assigned resources associated with that beam 412. Multiple satellites may create beams that cover a satellite terminal, which means that operational mapping between each satellite terminal 414 and a satellite 402 (and beam 412) should be determined.

Figure 17:
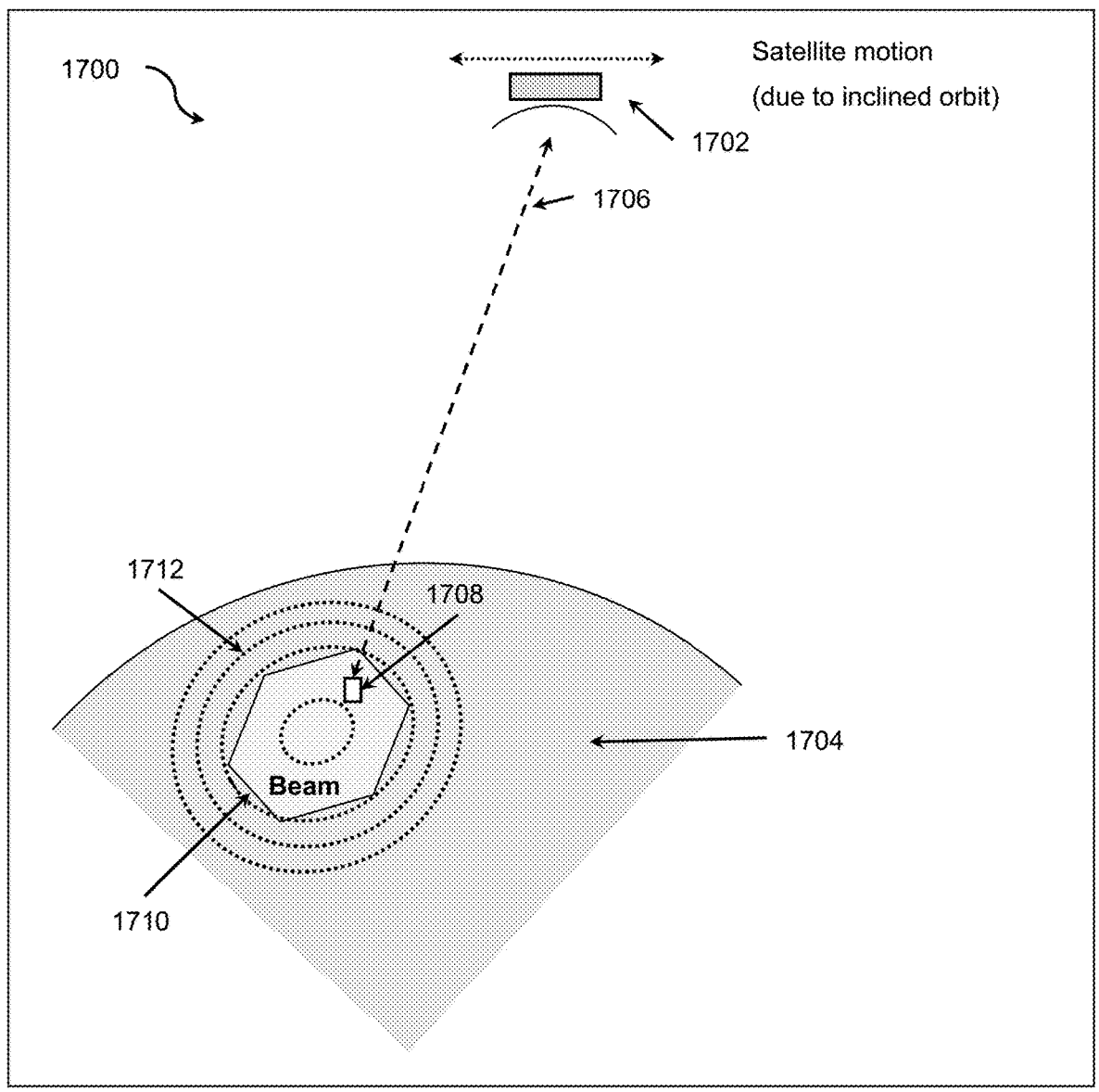
FIG. 17 is a schematic diagram showing beam characteristic parameterization for satellite communication links according to one embodiment of the subject invention.

FIG. 17 shows a partial communication system 1700 with a satellite 1702 in orbit above the Earth's surface 1704. The satellite 1702 communicates with a terminal 1708 by creating a beam 1710 on the Earth's surface 1704. When the terminal 1708 is located within the beam 1710 a signal path 1706 between the orbiting satellite 1702 and ground-based terminal 1708 can be created. Typical system designs are based on a paradigm of coincident forward and return link geographic beams, i.e., the beams (such as beam 1710) can be defined in terms of a polygon (typically using latitude and longitude units) where that polygon is the same for the uplink and downlink. That is, such a polygon is referred to as a geographic beam 1710. The radiated beams form a beam gain pattern 1712 which is formed by the radio frequency elements overlaying the geographic beams 1710 and will differ in shape between the forward and return link for many reasons including that they are generated by different hardware at different frequencies. From the satellite's 1702 perspective, the formed beams (such as beam 1710) have widths that are typically in the order of 0.2 degrees.

Figure 19:
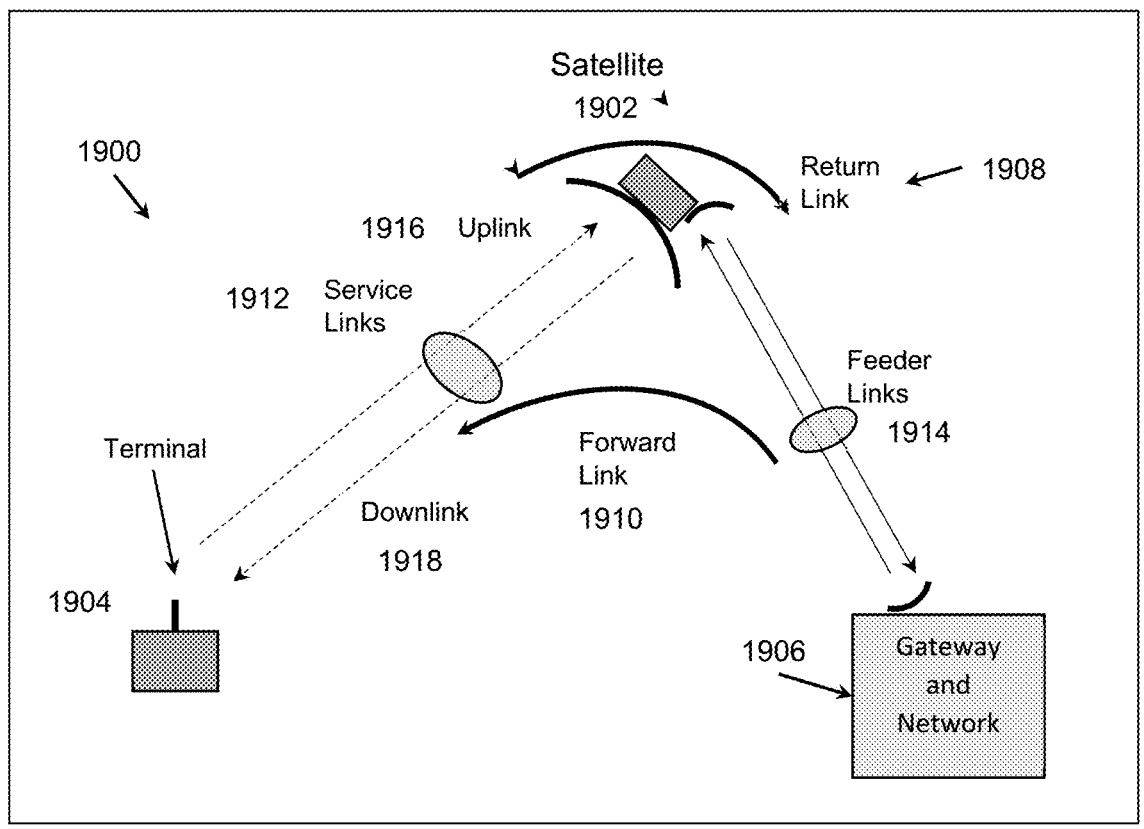
FIG. 19 is a schematic diagram of a system showing the communications links to and from the satellite according to one embodiment of the subject invention.

As shown in FIG. 19, embodiments of a communication system 1900 can include a satellite 1902, a terminal 1904, and network infrastructure including a gateway and network 1906. The terminal 1904 communicates with the gateway and network 1906 through the satellite 1902 on a return communication link 1908 and the gateway and network 1906 communicate with the terminal 1904 through the satellite 1902 using a forward communication link 1910. Service links 1912 can be used for the terminal 1904 to satellite 1902 communication with the uplink 1916 providing communications from the terminal 1904 to the satellite 1902 and the downlink 1918 providing communications from the satellite 1902 to the terminal 1904. Feeder links 1914 can be used for satellite 1902 to gateway and network 1906 communication.

MSS satellites often operate in inclined orbits. That is, the plane of the orbit (nominally above the equator) is offset from the equatorial plane by angles in the order of 5 degrees (where this inclination varies over the life of the satellite). The purpose of allowing such inclined orbit operation is to reduce satellite fuel consumption for station keeping. To maintain the location of beams on the ground, the beam-forming mechanism adjusts the shape of the beams throughout the period of a sidereal day, i.e., the period of a satellite's orbit. This is typically done using discrete changes to the coefficients driving the beam formation at intervals of, perhaps, tens of minutes. At the time the coefficients change, so does the shape of the beams. In addition, even when the coefficients are not changed, the beam shape (as seen on the ground) changes due to the motion of the satellite.

The gains in the forward and return link beams (as seen by a terminal) both contribute to the accuracy that can be achieved when setting the power at the terminal's transmitter. By communicating this gain information to the terminals, the accuracy of power setting can be improved. As a contributor to the determination of a terminal's transmit power setting, description of the gain pattern in both the forward and return link beams can be provided via System Information. For example, the System Information can include information that described at least one beam's shape in terms of gain as a function of spatial location formed by the satellite's transmitter, gain as a function of spatial location formed by the satellite's receiver, gain differences between the satellite's transmitter and receiver as a function of spatial location, or any number of other ways. These descriptions can enable a terminal to determine gain approximations related to the paths to and from the satellite as a function of the terminal's location.

Terminals will typically determine their locations using GNSS (Global Navigation Satellite System) receivers, e.g., GPS (Global Positioning System). Alternatively, for fixed-position terminals (e.g., in a utility meter), the position could be entered during configuration. If a terminal cannot obtain a location estimate by either of these means, the terminal could estimate its position using the observed SNR values associated with the camped beam and its neighbors. A camped beam is a beam from which a terminal is receiving System Information. The terminal may obtain these SNR estimates from correlations that arise during acquisition. The position estimate could then be derived by the terminal by matching the observed SNR values with the beam pattern descriptions. In the case when the same carrier frequency is used for the forward link pilot in neighboring beams, a terminal can estimate the SNR from several beams simultaneously. Once a terminal has established connectivity with the network, it may provide the SNR estimates to the network, which could generate a similar position estimate. The network could have the additional advantage of observations of the received signals from the terminal in multiple beams, the Round-Trip Time, and potentially more detailed beam pattern estimates.

In various embodiments of the invention, communication links use sporadic transmission of a small number of bursts, frequently a single burst. Sporadic can mean, for example, daily or monthly individual burst transmissions. This environment differs from situations in which many bursts are transmitted with short inter-burst intervals (where short is relative to the rate at which the channel conditions change). Short inter-burst transmissions, for example, could occur at regular intervals (e.g., every 20 ms), or could be less regular. For example, they could be dependent on packet user traffic and possibly with keep-alive bursts (i.e., special transmissions aimed at maintaining synchronization and power setting in a link). Power control in such continuous or near-continuous transmission situations is typically based on open-loop initialization, followed by closed-loop tracking and correction. As the majority of bursts are transmitted with closed loop control, the precision of open loop corrections has low impact on overall power control effectiveness.

In the case of sporadic transmissions, such as the single burst messages sent in embodiments of the invention, power is primarily set based on open-loop corrections. As such, the precision of open-loop estimates of suitable power levels gains significance in terms of overall power efficiency and capacity. To determine the level of the transmit power, a terminal can consider some or all of the following information:

The received pilot Signal-to-Noise Ratio (which can be estimated during the demodulation process at the terminal receiver);

An estimate of the gain difference between the forward and return link gain patterns at the terminal's location (which can be read from the broadcast System Information);

A long-term updated correction, based on feedback from the network regarding prior transmission (which can be stored at the terminal based on previous communications);

A constant corresponding to the link budget (which can be read from the System Information); and A power offset corresponding to current interference conditions (which can come from the satellite when the terminal listens to the forward link prior to sending its burst message).

A communication system could support several modes of connectivity including scheduled transmission, broadcast, alarm transmissions, and/or page transmissions, to mention a few. Some applications might benefit from timely delivery of information. For example, the triggering of an intrusion alarm or high-temperature alarm might be reported promptly. "Rapid Alarms" and "Rapid Pages" are described below, where these connectivity options support communication in the return and forward directions, respectively.

In the case of a Rapid Alarm, a burst containing time-critical information can be transmitted from a terminal to the network. Two key aspects of the burst can be (1) it has enough payload to convey the associated information, and (2) the burst can be transmitted at a high rate. In order to select a high transmission rate, the terminal should confirm that the return link channel has enough margin to enable a high probability of successful communication at that rate. To do this, the terminal combines the power control information derived above with knowledge of the additional power associated with higher transmission rates. The terminal may have multiple options regarding the transmission rate, based on network-advertised (e.g., via System Information) possibilities.

Satellite communications channels may be shared. Generally, a communications channel is a frequency band, with a lower and upper frequency, through which a waveform can be transmitted. A communication channel could be shared, for example, by a forward link transmission according to the subject application and the BCCH of another air interface. When channels are shared, the operation of the links can be impacted. For example, the Signal-to-Noise Ratio measured at the terminal receiver may be lower than it would have been in a dedicated channel, i.e., where the communications channel is not shared. This difference could impact the power control, where open-loop actions depend on the received signal metrics. By informing the terminals of the nature of the sharing of a communications channel, performance can be improved. If a terminal is aware of the characteristics of the co-channel interference (the shared signal), then it may adjust the power control mechanism. For example, knowing that the shared channel is active, and that it uses bursts of length 20 ms, the terminal could observe the received signal over several seconds, and excise the periods when the interference is active from the calculation of Signal-to-Noise Ratio.

In the process of determining the appropriate transmit power, a terminal is implicitly determining an estimate of the margin in that power. For example, if a terminal determines that it should transmit at −0.2 dBm, and the terminal's peak power capability is 10 dBm, then the margin is 10.2 dB. From this number, the terminal can determine whether or not it could transmit at a higher data rate, e.g., if an alternative bearer requires 6 dB more power than the current bearer, then the terminal could conclude that the alternate bearer is a viable option, and that the associated power should be 5.8 dBm.

If the terminal's position estimate has uncertainty corresponding to several kilometers, then the terminal may determine that it cannot be confident of the accuracy of its transmit timing. Such errors lead to the possibility of coincident pilot sequence reception (which can degrade reception performance). To mitigate this possibility, the terminal can apply frequency offsets to increase the probability of successful reception of the related burst.

Terminal transmit timing can be defined via instructions from the network. That is, burst transmit times can be deterministically preassigned without conflict. For other connection options (e.g., a Random Access burst), the terminal may autonomously select a transmission time. To reduce the probability of timing conflict (between preassigned and non-preassigned transmissions), these non-preassigned bursts can be allocated separate transit time opportunities. In addition, frequency offsets can be applied to enable reception of simultaneously transmitted bursts to address the possibility that two non-preassigned bursts happen to coincide in time.

If significant timing errors are present in transmitted bursts, it is possible that the network receiver will not be certain of the timeslot within which the burst was transmitted. This information may impact the determination of the identity of the transmitter, leading to ambiguity that should be resolved. Information embedded in the transmitted burst as a distinct code pattern enables resolution of this ambiguity. As briefly mentioned above, prior to transmission, terminals can read the System Information describing the forward and return link beam shapes, and can use this information to determine the optimal transmit power. Many approaches can be used in defining the shape of beams. The following is an example. It is desirable to target accurate gain estimates with a modest quantity of parametric information. The gain pattern (beam shape) of both the forward and return beams can be communicated to terminals via the System Information (SI). The description of uplink and downlink beams may consist of parameters such as those listed below:

SI_(FWD and RET)_beam_width_control: a parameter defining the spread of the beam pattern in the East-West cross section, corresponding to the beam width;

SI_(FWD and RET)_beam_EW_NS_ratio: a parameter allowing control over the difference in width of the beam in the North-South cross section vs. East-West;

SI_(FWD and RET)_beam_center_offset: a vector corresponding to the offset between the geographic beam center to the radiated beam center;

SI_(FWD and RET)_beam_center_frame_number: the frame number at which these parameters are defined (as the terminal is aware of the satellite's motion profile);

SI_FW_beam_EIRP: the EIRP of the pilot in the BCCH containing the SI;

SI_FWD_neighbor_beam_EIRP: the EIRP of the pilot in the BCCH of each neighboring beam; and SI_RET_beam_G_over_T: the G/T of the return beam.

In various embodiments of the invention, beam gain information is defined from the satellite's perspective, i.e., at angular offsets from a beam center. The beam center itself typically lies at a 2-D angular offset from the boresight of the satellite's antenna. The cross-section of narrow formed beams (i.e., where the antenna and the array of emitters or receivers are forming the narrowest practical beams) is usually consistent for the range of gain of interest (~3 dB within the geographic beams). Therefore, that consistent pattern can be used as a basis for compression of the beam definition information.

Beam shapes can typically be approximated by equation including those based on sin(x)/x or Bessel functions. For purposes of illustration, embodiments of the invention are described herein using the sin(x)/x (or sinc) functions. However, it should be understood that other beam shape description techniques can also be used.

The cross-section of a beam pattern is likely to be radially similar, i.e., close to the same when cut across any angle. In order to accommodate some variation, different spreads as a function of angle are supported in the East-West vs. North-South cross sections (with elliptical variation assumed at other angles). In alternative implementations, the frames-of-reference can differ, e.g., along a line passing through the satellite's boresight and the beam's geographic center, and at 90 degrees from that line.

Beam profiles can be generated using the formula Gain_dB (p,theta_deg)=sin(($e^p$))*theta_deg)/theta_deg. In this equation, theta_deg represents angles seen from the satellite's perspective, the "p" parameter controls the width of the beam, and e corresponds to the constant e (Euler's number). In various embodiments of the invention, the parameter SI_(FWD and RET)_beam_width_control can be used for "p". The theta_deg variable, which is the angular offset of the terminal as seen from the satellite's perspective relative to the center of the beam containing the terminal can be determined by the terminal.

The exponential ($e^p$) is applied so that sensitivity to the parameter value "p" has a low variation across the applicable range. The parameter "p" comfortably covers the range of possible beam widths (0.04 degrees to 1.1 degrees) using the range 1:4 and, for some of the embodiments described herein, the maximum step size in power per parameter unit "p" is 1.1 dB. A step-size in the parameter (p) of $1/128$ can ensure that steps in power are less than 0.1 dB over the required range. That is, a step size of 1.128 over a range from 1 to 4 is sufficient, i.e., 9 bits. A conservative implementation (i.e., one with 2 additional bits) of the related parameter, p (which can be SI_FWD_beam_width_control or SI_RET_beam_width_control), could be formatted as an 11 bit unsigned value. In the 11 bit scenario, p=p_min+N*($1/256$). Thus, p=p_min (which=0) when the N is 0 and the maximum value (when N=2047) is 2047/256 (which=7.996).

The position of the beam center can be defined by SI_beam_center_offset. The location of the center of the radiated beam can have some error relative to the geographic center. This offset can be passed to the terminal via the System Information. At the edge of coverage for representative small beams (0.15 degrees width), 0.1 dB change in power occurs with a ~0.001 degrees change in beam location. Assuming a maximum error of 0.25 beam widths and a 0.5 degree beam, the range of the parameter would be −0.125 to 0.125, implying that an 8-bit parameter in each direction would be sufficient. A conservative implementation (i.e., one with 2 additional bits) of the related parameter, c (which can be SI_beam_center_offset), could be formatted as a 10 bit signed value. In the case of a 10 bit signed value, c=c_min+N*(0.0005). Thus, c=c_min (which=−1.024) when N is 2048 and the maximum value (when N is 4095) is 1.0235 (−1.024+4095 (0.0005)).

The ratio of the cross sections of the beam could be defined by SI_beam_EW_NS_ratio. The expected value of this ratio is 1 and the range of variation is probably less than +/−10%. Given the sensitivity to error, where ~0.6% (0.001 out of 0.150 degrees), a reasonable step size could be 0.3% over a range of +/−20%, requiring 7 bits. A conservative implementation (i.e., one with 2 additional bits) of the related parameter, r (which can be SI_beam_EW_NS_ratio), could be formatted (in percentage units) as a 9 bit signed value. In the case of a 9 bit signed value, r=r_min+N*($1/6$). Thus, r=r_min (which=−42.66%) when N is −256 and the maximum value (when N is 511) is 42.5% (−42.66+511/6).

The EIRP can be defined by SI_beam_EIRP. The EIRP of the pilot of the BCCH will typically be ~33 dBW in the direction of maximum gain, i.e., the peak of the beam pattern. The beam EIRP is typically defined at the edge of the beam, where it can be −2-3 dB lower. The range of values around this level could reasonably be +/−10 dB. Hence, a reasonable number of possible values could be ~200, corresponding to 8 bits. A conservative implementation (i.e., one with 2 additional bits) of the related parameter, e (which can be SI_beam_EIRP), could be formatted (in dBW) as a 10 bit unsigned value. In the case of an unsigned 10 bit value, e=e_min+N*(0.05). Thus, e=e_min (which=0) when N is 0 and the maximum value (when N is 1023) is 51.15 dBW (0.0+1023*(0.05)).

The G/T can be defined by SI_beam_G_over_T. The G/T of the receiver will typically be ~10 to 24 dB/K in the direction of maximum gain. The range of values around this level could reasonably be +/−10 dB. Hence, a reasonable number of possible values could be ~400, corresponding to 9 bits. A conservative implementation (i.e., one with 2 additional bits) of the related parameter, g (which can be SI_beam_G_over_T), could be formatted (in dB/K) as a 10 bit unsigned value. In the case of an unsigned 10 bit value, g=g_min+N*(0.05). Thus, g=g_min (which=0) when N is 0 and the maximum value (when N is 1023) is 51.15 dB/K (0.0+1023*(0.05)).

The forward link beam patterns provided to the terminals via System Information can be used as a basis for approximation of the terminal's location. While neighboring beams may or may not use the same carrier frequencies, the example described herein is based on use of the same frequencies. If neighboring beams use different frequencies, a similar approach could be applied (although possibly with diminished accuracy). In other words, in various embodiments described herein, a terminal can receive and perform a correlation with a waveform.

In each beam, a forward link transmission can include a pilot waveform where the same chip sequence is used in each beam, but the sequence is offset in time for each beam. As such, no two neighboring beams will use the same time offset. The EIRP transmitted from the satellite may vary for neighboring beams. One advantage to such differences is that a similar link margin is provided in neighboring beams even when those beams may have differing path lengths to the satellite. When receiving the pilot waveforms from the occupied beam and its neighbors, the terminal can correlate the sequences with the hypothesized pilot sequence and observe levels of correlation that are proportional to the pilot levels being received from each beam. The signal levels from each beam's pilot can be received simultaneously and can all be impacted by the same thermal noise. As a result, the pilot levels can provide a useful indication of the relative levels of each pilot signal as transmitted by the satellite and after being attenuated by the beam former.

The relative pilot levels observed can then be matched with the forward link gain of each of the beam formers. The terminal should be aware (via the System Information in the camped beam) of the relative time offsets of each of the beam's neighbors. Using the know EIRP differences between beams, the terminal can determine power adjusted correlation values. The terminal can select the three highest level power adjusted correlation estimates (from among up to 7 beams) that correspond to three beams that share a vertex. The terminal can determine differences in correlation (in dB units) between the three levels. The terminal can use the forward link beam definition as a model for each of these three beams.

The terminal can find the location best matching the differences in correlations. The difference in correlation between the highest and second highest correlations can correspond to a line on the earth's surface. The difference between the highest and third highest correlations can correspond to another line on the earth's surface. The point at which the lines intersect corresponds to a position estimate for the terminal.

A more precise position estimate could be generated at the network, based on the same correlation measurements, possibly in combination with Round-Trip Times. That is, the terminal could report the observed correlations to the network, which could match those correlations with more accurate models of the formed beams. The network could observe transmissions from the terminal via the receivers in several beams, enabling a similar position estimate based on SNR values at the satellite.

Return link power control can utilize the beam gain information for power control calculations. In generating the terminal transmit power levels, a variety of different information is combined. For example, the perceived SNR of the forward link pilot (SNR_pilot_dB), which provides an indication of the loss in the forward link, can be used. A parameterized power increment provided by the network (Power_incr_dB) can also be used. This is a value that enables the network to control the power of all terminals in a beam. The level can be raised when the beam approaches capacity, i.e., the interference power approaches the noise power. A long-term estimate in the terminal correcting for perceived differences in the forward and return link gains of the antenna (TD_FWD_RET_gain_diff_est_dB) can also be used. This estimate can be based on the history of correction information passed to the terminal after previous (sporadic) transmission. The terminal may use the direction of the satellite (Azimuth and Elevation) to refine its internal antenna model in terms of relative receive and transmit gain. A parameterized value representing the gain difference between the Forward and Return link gains at the satellite provided by the network (Sat_FWD_RET_gain_diff_est_dB) can be used in the power control calculation. This value may be passed to the terminal using a set of parameters that characterize the variation of gain across the beam and over time. Finally, a parameterized constant providing an offset associated with the link budget (Link_constant_dBm) can be used in the power control calculation.

In one embodiment, the above-mentioned information can be used to determine the open-loop transmit power using the equation:

$$\text{Transmit power} = \text{Power\_incr\_dB} + TD\_FWD\_RET\_gain\_diff\_est\_dB + Sat\_FWD\_RET\_gain\_diff\_est\_dB - SNR\_Pilot\_dB + \text{Link\_constant\_dBm}$$

A typical Transmit power value can be about −0.2 dBm based on typical values for the factors being: Power_incr_dB~2 dB; TD_FWD_RET_gain_diff_est_dB~−1.3 dB; Sat_FWD_RET_gain_diff_est_dB~0.7 dB; SNR_pilot_dB~−18.0 db, in units of Ec/No; and Link_constant_dBm~−19.6 dBm.

The energy required to transmit a fixed quantity of data does not depend (significantly) on the power level, i.e., data can be transmitted over longer periods with less power or shorter periods with more power. The nature of each application can drive the need for timeliness of delivery. Applications such as daily utility meter reading may have modest latency requirements, perhaps many minutes. Other applications, such as reporting of a facility intrusion, might be better served by quicker message delivery, perhaps within a second. Given fixed maximum power capability in a terminal, achievable latency can depend on the link margin at the time of the transmission. Link margin can be defined as the difference between the required power and the available power. The accuracy with which that margin can be estimated can drive the ability of a terminal to achieve low latency when needed.

Bursts can be transmitted by terminals at different information bit rates. In some connectivity modes, the terminal can autonomously select the time to transmit and the information rate to apply. This mode of operation is particularly useful in cases where the delay in delivery of information from terminals to the network is important. One approach taken in various embodiments described herein is to support two different data rates called "baseline" and "eight times baseline."

When operating at a "baseline" information data rate, the input can contain 112 payload information bits. Adding an appended 16-bit Cyclic Redundancy Code (CRC) yields 128 uncoded bits. Error correction coding, at a rate of ¼, yields 512 coded bits. Each coded bit can be spread using a 256 bit Walsh code, yielding a total burst length of $2^{17}$ bits. A 1024 bit Gold code can be combined (in this case via an XOR functions) with groups of 4 coded bits (each spread by 256 Walsh codes), such that each group has the duration of a timeslot. Each quarter of a timeslot, associated with a Walsh code, is usually called a symbol. That is, each coded bit corresponds to a symbol. In this case, there can be 128 timeslots and 512 symbols in each burst. The same 1024 bit Gold code can be used to generate a pilot waveform, in combination with a 256 bit Walsh code, where the Walsh code is orthogonal to the Walsh codes used for the coded bits. Each of the $2^{17}$ bit combinations (pilot and traffic) in a burst can be transmitted as a chip (i.e., a filtered waveform) with time spacing (from chip-to-chip), of a chip period and the time taken to transmit $2^{17}$ chips is a frame.

When operating at an information data rate that is "eight times baseline," a similar approach can be taken with some key differences which are highlighted as italicized text. In this case, the input can contain 112 payload information bits. Adding an appended 16-bit Cyclic Redundancy Code (CRC) yields 128 uncoded bits. Error correction coding, at a rate of ¼, yields 512 coded bits. Each coded bit can be spread using a 32 bit Walsh code, yielding a total burst length of $2^{14}$ bits. A 1024 bit Gold code can be combined (in this case via an XOR function) with groups of 32 coded bits (each spread by a 32 bit Walsh code), such that each group has the duration of a timeslot. There can be 16 timeslots in each burst. The same 1024 bit Gold code can be used to generate a pilot waveform, in combination with a 256 bit Walsh code, where the Walsh code is orthogonal to the Walsh codes used for the coded bits. The 256 bit Walsh code used differs from the code used at the baseline data rate. Each of the $2^{14}$ bit combinations in a burst can be transmitted as a chip (i.e., a filtered waveform) with time spacing (from chip-to-chip), of a chip period and the time taken to transmit $2^{14}$ chips is an eighth of a frame.

In summary, a terminal could transmit at two (or more) different data rates. For a terminal transmitting at a higher rate, the threshold Signal-to-Noise Ratio would generally also be higher. As the terminal can autonomously select the information data rate, it could determine whether the achievable Signal-to-Noise ratio is sufficient to support the selected rate. This information can be implicitly derived during the process of determining the appropriate power for transmission as described for power control.

For example, when considering a terminal operating at the baseline rate, the terminal combines the measurements and parameter values, and determines that the transmit power (dBm) is −0.2 dBm. If the terminal has a maximum transmit power capability of 10 dBm, to transmit at 8 times the base line rate, the terminal could determine that it would need 9 dB of additional power. Note that this could be derived from the data rate difference directly (10*log 10(8)) assuming no change in energy per information bit, or there could be differences in Ebi/No performance that can be taken into account. That is, the terminal can determine that to transmit using the higher rate bearer, it would need to transmit at −0.2+9=8.8 dBm. As this is below 10 dBm, the terminal would have this option.

The design of spreading sequences used for terminal transmission can involve several tradeoffs. For example, the pilot waveform might be based on a pseudo-random sequence that continues for the length of a burst or it might use a shorter sequence that is repeated several times during the burst. The approach of using shorter, repeated sequences is sometimes referred to as a "repeated sequence pilot waveform." A disadvantage of using repeated sequences is that two transmissions from different terminals may have different start times of transmission, but coinciding timing of the pilot sequences (and this can occur for significant portions of the bursts). This possibility is called coincident pilot sequence reception.

Terminal transmissions usually contain pilot waveforms that consist of 128 repetitions of a 1024 bit pilot sequence. It is possible that two terminals could transmit bursts that are received at the satellite with the 1024 bit pilot sequences coinciding in time resulting in coincident pilot sequence reception. This could lead to degraded performance in the network receiver as the two signals from different terminals might not be distinguishable by the channel estimation process.

When bursts are transmitted from more than one terminal, the network can usually reliably distinguish those bursts and demodulate their contents. In order for the bursts to be distinguishable, the pilot waveforms within the burst should be separated in time by more than a chip period, i.e., coincident pilot sequence reception is avoided or the perceived carrier frequencies of the burst are separated by a frequency offset. The frequency separation needed depends on the implementation of the receiver but typically values of ~3 Hz or more usually work.

Return link bursts can be received at any time, i.e., the detection and reception processes operate continuously. However, to enable a distinction between transmitters and to avoid coincident plot sequence reception, transmission times can be assigned and applied by terminals. Over the period of a frame, 508 transmit opportunities can be defined and, in typical operation (as set by a System Information parameter), 254 of these can be available. At a transmission rate of 23.4 kcps, there is one transmit opportunity every ~22 ms. When viewed from the perspective of the pilot waveform, the targeted minimum time spacing of transmit opportunities is 4 chips.

Actual transmission time can be impacted by error in the terminal's estimate of its position. The acceptable error in a position estimate can depend on the associated timing errors. Regarding the timing of terminal transmissions, given a separation of 4 chips between assigned transmission times, the combined error in timing between two terminals should be less than 3 chips periods, so the waveforms do not come within 1 chip period time separation. Each terminal, therefore, should have a position-related timing error of less than 1.5 chip periods. At 23.4 kcps, this corresponds to a timing error of ~64 us. Errors in timing typically correspond to twice the distance error (as the reference signal from the satellite experiences a first delay and the return transmission to the satellite experiences a second delay). Assuming that the distance error is in the direction of the satellite (a conservative assumption), the threshold position error would be $\sim 3 \times 10^8 \times 64 \times 10^{-6}/2 = 9{,}600$ m. Allowing comfortable margin for uncertainty in the position estimation error, a reasonable threshold when defining the acceptable error could be 5 km. If the terminal can reliably determine that its position error is within this range, then it can be defined to have an accurate position estimate.

Errors in the order of kilometers in position estimates can arise in a variety of ways. For example, if a terminal has a GPS location and subsequently moves (and does not get a fresh fix), then the worst case position error can be estimated based on the maximum speed of the terminal and the time since the fix was obtained. Another example is if a terminal's position estimate is based on SNR measurements from the pilot waveforms. In this case, the error could be well over 5 km.

Various circumstances can result in coincident pilot sequence reception at the network receiver. For example, position estimation error at the terminals and simultaneous transmission of non-preassigned bursts (e.g., due to coincident alarm events at the terminal inputs) can both result in coincident pilot sequence reception.

Bursts transmitted by terminals can be categorized as either preassigned or non-preassigned. If both the terminal and the network are aware of the intended transmission of a burst and its transmit time, then that burst can be considered preassigned. Otherwise the burst is typically considered non-preassigned. Terminals, being aware of these conditions, can apply frequency offsets to their transmitted bursts in both cases. The level of frequency offset can be defined by System Information (e.g., setting the units of separation to 3 Hz.) That is, the frequency offset could be set as 3N Hz (where N is a signed integer within a defined range). For transmissions with preassigned timing, the value of N can be derived from the assigned Return Link Timeslot number. For example, the value could lie in the range 0:507 interpreted as a 2's complement value. For transmissions with non-preassigned timing (e.g., RACH), the value of N can be derived from the CRC of the transmitted burst. The intent of this approach can be to ensure that simultaneously transmitted bursts (with the same Return Link Timeslot number) are likely to use different frequency offsets.

The network can have awareness of the number of terminal transmissions that are preassigned and non-preassigned. In order to provide an additional means of distinguishing the burst categories, the network may assign specific transmit opportunities for each category. For example, preassigned bursts could be assigned to all even number Return Link Timeslot numbers and non-preassigned bursts to odd numbers. This distribution could be modified via System Information options.

Return link bursts can also be distinguished from one another by applying different pilot pseudo-random sequences. These sequences could be applied by using the same Gold codes (as all other forward link transmissions) and using different Walsh codes. One advantage of this option is to reduce the probability of coincident transmissions. One disadvantage is that it increases the complexity of the network receiver by requiring adding another pilot sequence hypothesis. To support this option, System Information could inform the terminals of the available Walsh codes for Pilot generation.

The design of waveforms transmitted by terminals can be a key contributor to the efficient transmission of small volumes of data in that it can drive the power and bandwidth efficiency of a communication system, particularly for small messages. In various embodiments of the invention, a waveform that enables efficient communication of approximately 100 bits (112 bits in the embodiment described herein) is disclosed.

The waveform disclosed in embodiments of the invention is designed to address the challenging constraints imposed on the communication system. The Doppler frequency offset of a satellite is generally known and may be corrected but, there can be an unknown "Doppler" frequency offset at the receiver. The receiver offset can be as much as +/−300 Hz and can be dominated by the unknown relative motion between the terminal and the satellite. In addition, the arrival time of the signal can be uncertain, and the received signal can be relatively weak. For example, the Signal-to-Noise Ratio, Ec/No, could be about −27 dB.

Defining transmitted waveforms which improve the efficiency of systems transmitting relatively small volumes of data involves weighing various objectives and considerations. For example, the received signal should preferably be demodulated with an acceptable error rate, the channel state information (CSI), particularly the phase, should ideally be successfully estimated, and the presence of the waveform should be detectable. The "channel estimation" and "burst detection" objectives can be addressed by the addition of signaling to the waveform. Such signaling can require energy and this energy generally cannot be assigned to the information-bearing part of the waveform. Thus, the assignment of energy between the various parts of the waveform can be optimized to minimize the total energy required to achieve an acceptable error rate.

In general, the same waveform can be used for channel estimation and burst detection. The energy needed for channel estimation can vary with the amount of information in a burst, while the energy needed for burst detection is generally independent of the amount of information in the burst. There typically is a quantity of information at which the energy needed for channel estimation and for burst detection is equal. This point usually corresponds to the situation wherein the minimum number of information bits are transmitted without adding overhead to enable detection. Various embodiments of the invention described herein can be designed to achieve this balance.

The waveform used for channel estimation and burst detection in this embodiment is called the "pilot." The pilot can exist throughout the length of the burst. Alternative approaches could use shorter Unique Words located in specific locations throughout the length of the burst. For example, a Unique Word of length, say, 2048 chips could be transmitted at the start of a burst. In addition, sequences of, say, 128 chips might be inserted at several positions through the burst. Burst detection can essentially be a search for the known sequence of chips in the pilot (that is, a specific binary sequence at the chip rate).

In this embodiment, the length of the pilot can be 131,072 chips or about 5.6 seconds. The long length of the pilot, the frequency offset, and the time-varying nature of the channel can make burst detection a challenging task. To reduce the complexity of burst detection, a pilot can be composed of repeated "short sequences." Burst detection, then, can become a search for the identical short sequences that comprise the pilot. For example, a short sequence may be a pseudo random sequence, such as a Gold code, of length 1,023 chips (and can be extended to 1024 chips). Less complexity is sometimes needed to search for the repeated copies of 1,024 chips rather than the full pilot (of length 131,072 chips). These short sequences correspond to a timeslot, and there are 128 timeslots in a burst.

The short sequences can be detected using a signal processing technique known as correlation. Correlation is where the received data is compared to a known copy of the short sequence and may take place in either the time domain or the frequency domain. Each domain has advantages and disadvantages.

Frequency domain correlation can be computationally efficient but can also impose strict constraints on the arrangement of the short sequences. For example, the short sequences should be arranged periodically such that the pilot is a simple repetition with each short sequence immediately following another. In turn, this can make burst detection difficult, since the correct position of a detected short sequence within the pilot (i.e., burst framing) should be determined. Furthermore, when multiple terminals are using the same short sequence, there can be a finite chance that the short sequences will collide (arrive at the same time) and degrade the performance of the receiver. One root cause of these problems can be that a composite pilot constructed from repeated short sequences can have poor "autocorrelation." That is, the pilot and shifted copies of the pilot can appear to be similar at the receiver.

On the other hand, time domain correlation may be less computationally efficient, but can allow more flexibility in the arrangement of the short sequences. In particular, the short sequences can be arranged such that the pilot has improved autocorrelation. In the context of the overall system, the loss of computational efficiency imposes a relatively small cost (to the low number of gateway receivers) while the increased flexibility yields an advantage to the very large number of terminals (through improved waveform design). Furthermore, recent advances in high performance computing (driven by the requirements of Machine Learning and Artificial Intelligence) have dramatically lowered the cost of computation. As such, the processing expense for time-domain operation is not a significant contributor to the cost of providing service. That is, time-domain searches are viable. It should be noted that the processing under consideration here occurs only at the network receiver (gateway station). The terminal receivers have no need for similar complexity.

Using the flexibility afforded by time domain correlation, both the position (in time) and the phase of the short sequences may be modulated to improve the autocorrelation of the pilot. Improved autocorrelation can result in more robust burst detection and lower the probability of pilot collision. The position in time of the short sequences can be modulated by incorporating selected time spacing between the short sequences. By doing this, it is much less likely that the short sequences of the pilot will significantly overlap with a time shifted copy of itself than it would be for periodically repeated short sequences to significantly overlap.

Figure 20:
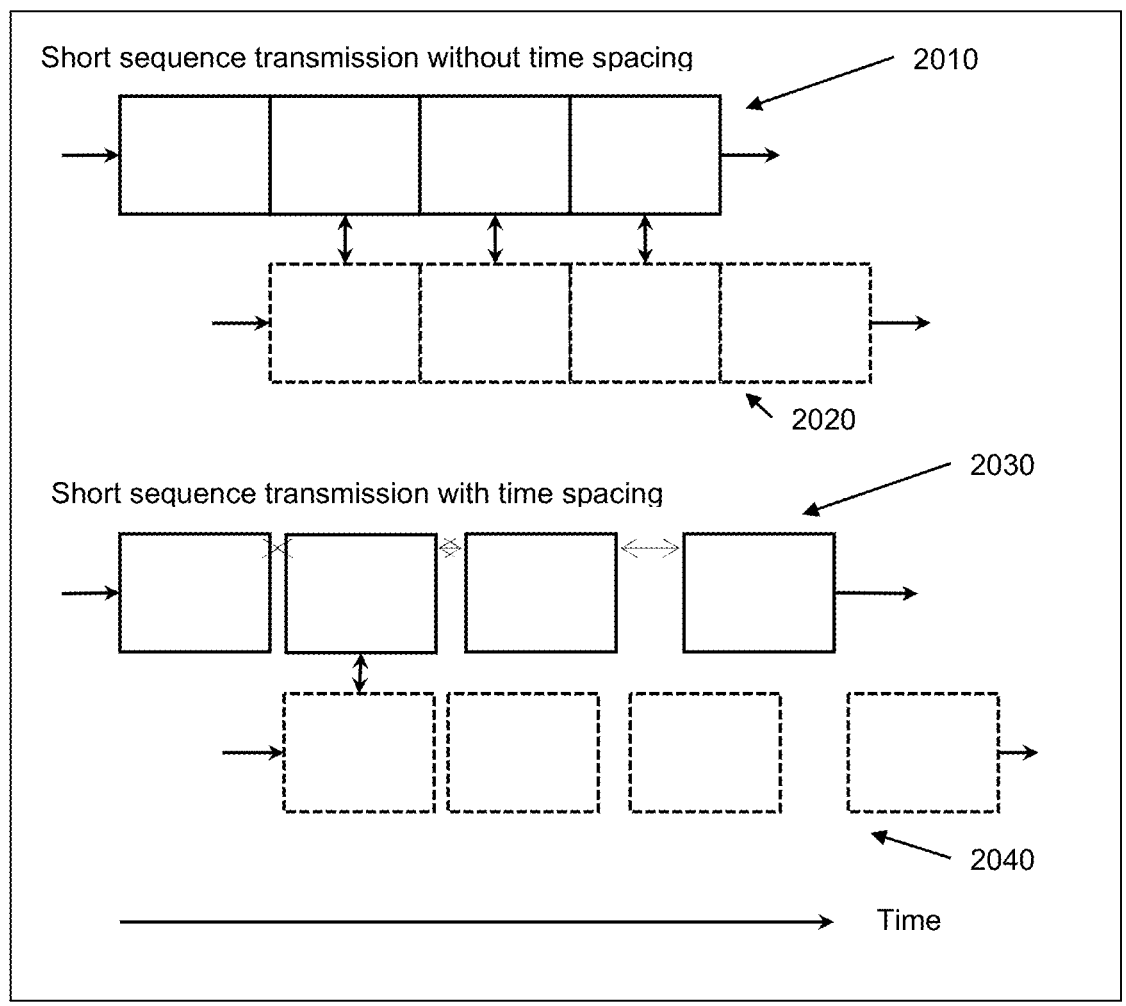
FIG. 20 is a schematic diagram showing time shifts between segments of a terminal transmitted waveform according to one embodiment of the subject invention.

Referring now to FIG. 20, without time spacing, several short sequences can coincide in time as illustrated by sequences 2010 and 2020. With increasing time spacing, the number of coinciding short sequences can be reduced as shown by sequences 2030 and 2040. When the average length of the time spacing is increased, the number of possible coincident receptions can be reduced. For example, with an average time spacing of about 10 chip periods, the maximum number of possible coincident short sequences can be reduced to 8 (out of a total of 128 short sequences in a burst).

Figure 21:
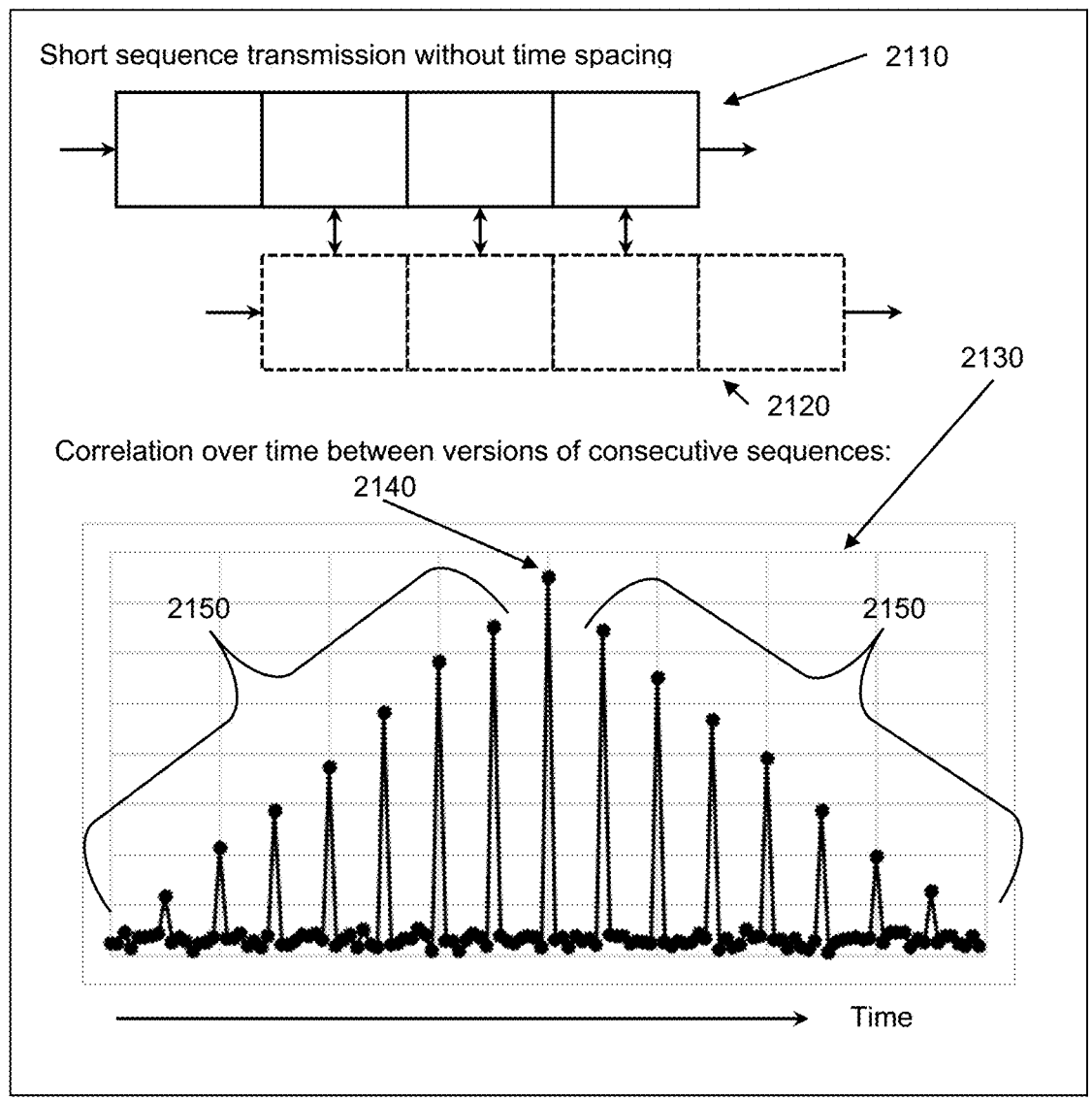
FIG. 21 is a schematic diagram showing the correlation between replicas of a waveform transmitted without time shifts between segments in a conventional communication system.
Figure 22:
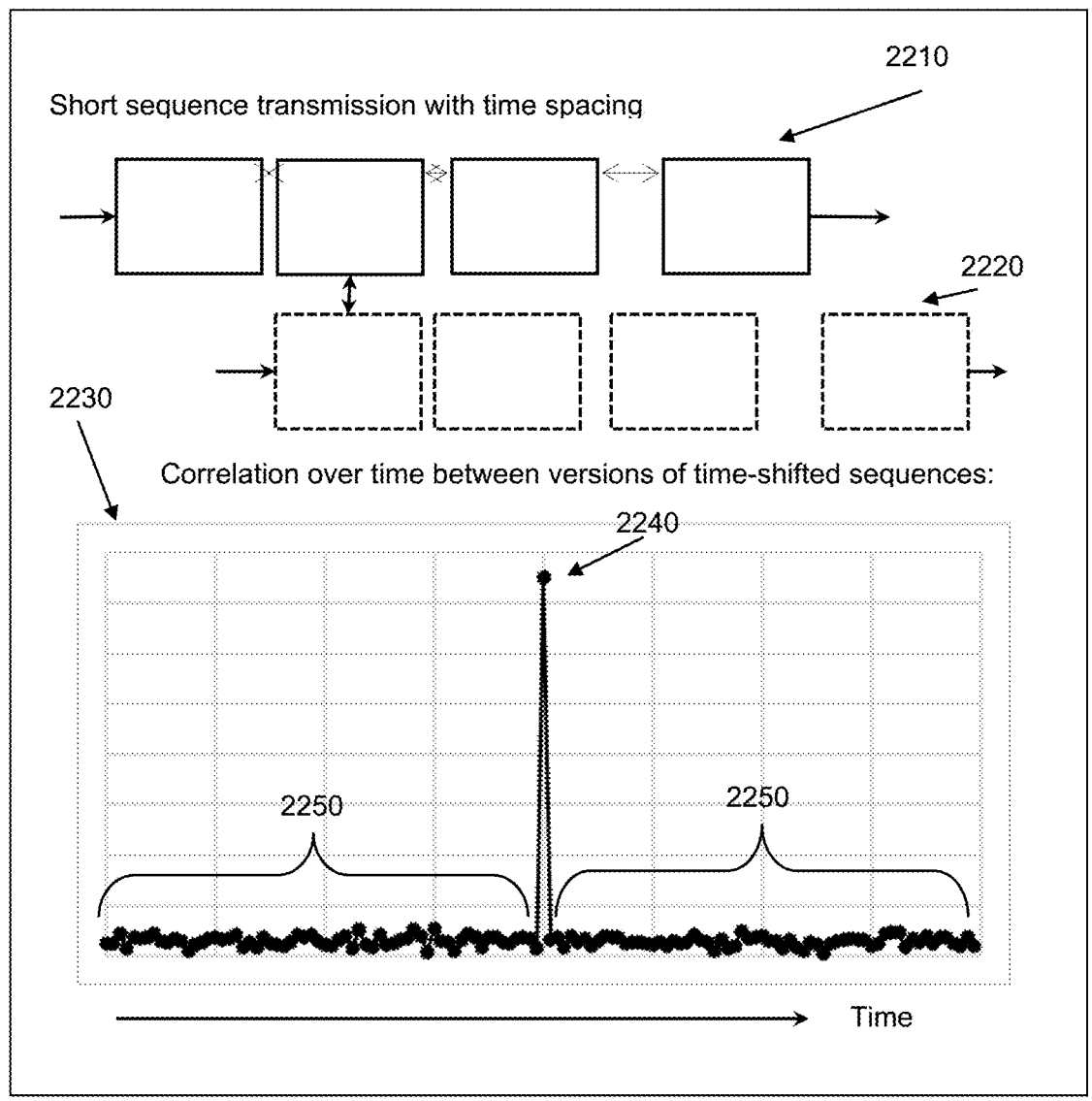
FIG. 22 is a schematic diagram showing the correlation between replicas of a waveform transmitted with time shifts between segments according to one embodiment of the subject invention.

FIG. 21 and FIG. 22 illustrate the reduction in the number of possible coincident receptions when time spacing is introduced between short sequences. Note that these figures are based on an illustrative example with 16 short sequences. In FIG. 21 no time spacing is applied between the 16 short sequences represented by 2110 and 2120, so the autocorrelation function 2130 has numerous peaks (time-separated by the length of the short sequence). For example, the center peak 2140 corresponds to all 16 short sequences being time aligned, and the neighboring peaks 2150 correspond to 15 of the 16 short sequences matching. The center peak 2140 can be defined as being in-phase. All the other peaks 2150 are out-of-phase.

FIG. 22 illustrates 16 short sequences represented by 2210 and 2220 with time spacing between the sequences. With time spacing inserted in the waveform, the autocorrelation function 2230 can be as shown in FIG. 22, where a single peak 2240 dominates. That is, as shown in FIG. 22, in-phase autocorrelation peak 2240 has a significantly higher magnitude than the out-of-phase autocorrelation peaks 2250. For example, in one embodiment of the invention, the in-phase peak 2240 can be 8-12 dB or more higher than the out-of-phase peaks 2250.

Figure 24:
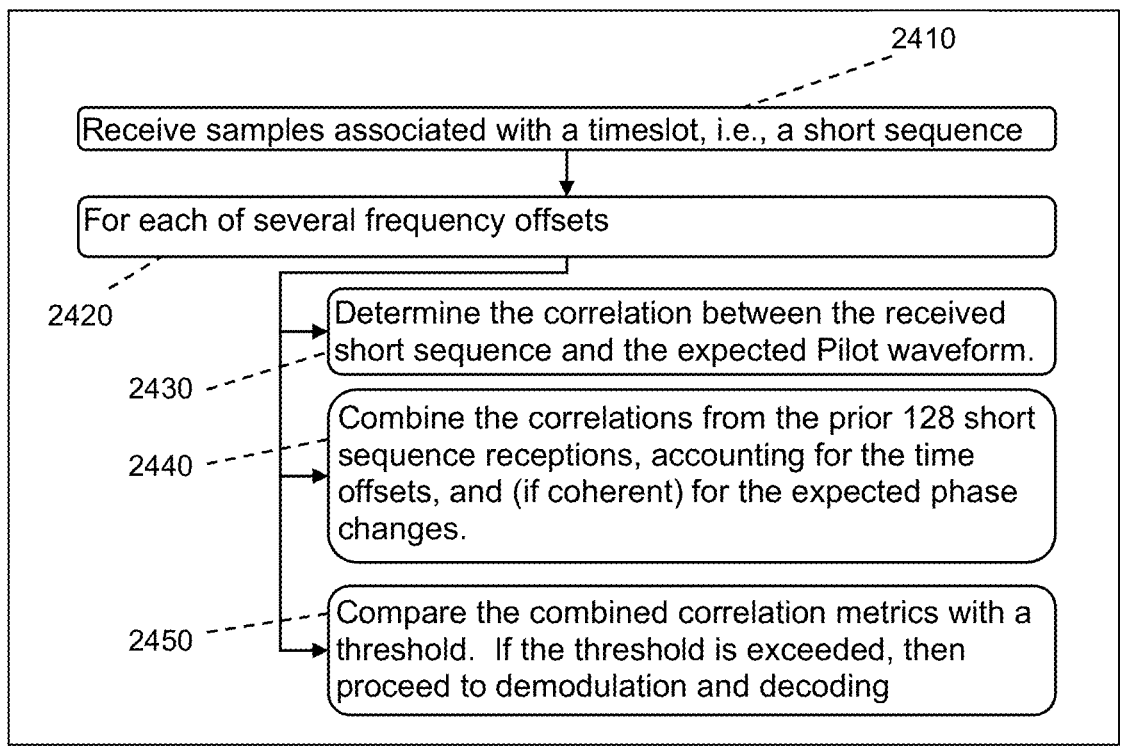
FIG. 24 is a flow chart illustrating an exemplary burst reception as seen by a gateway according to one embodiment of the subject invention.
Figure 25:
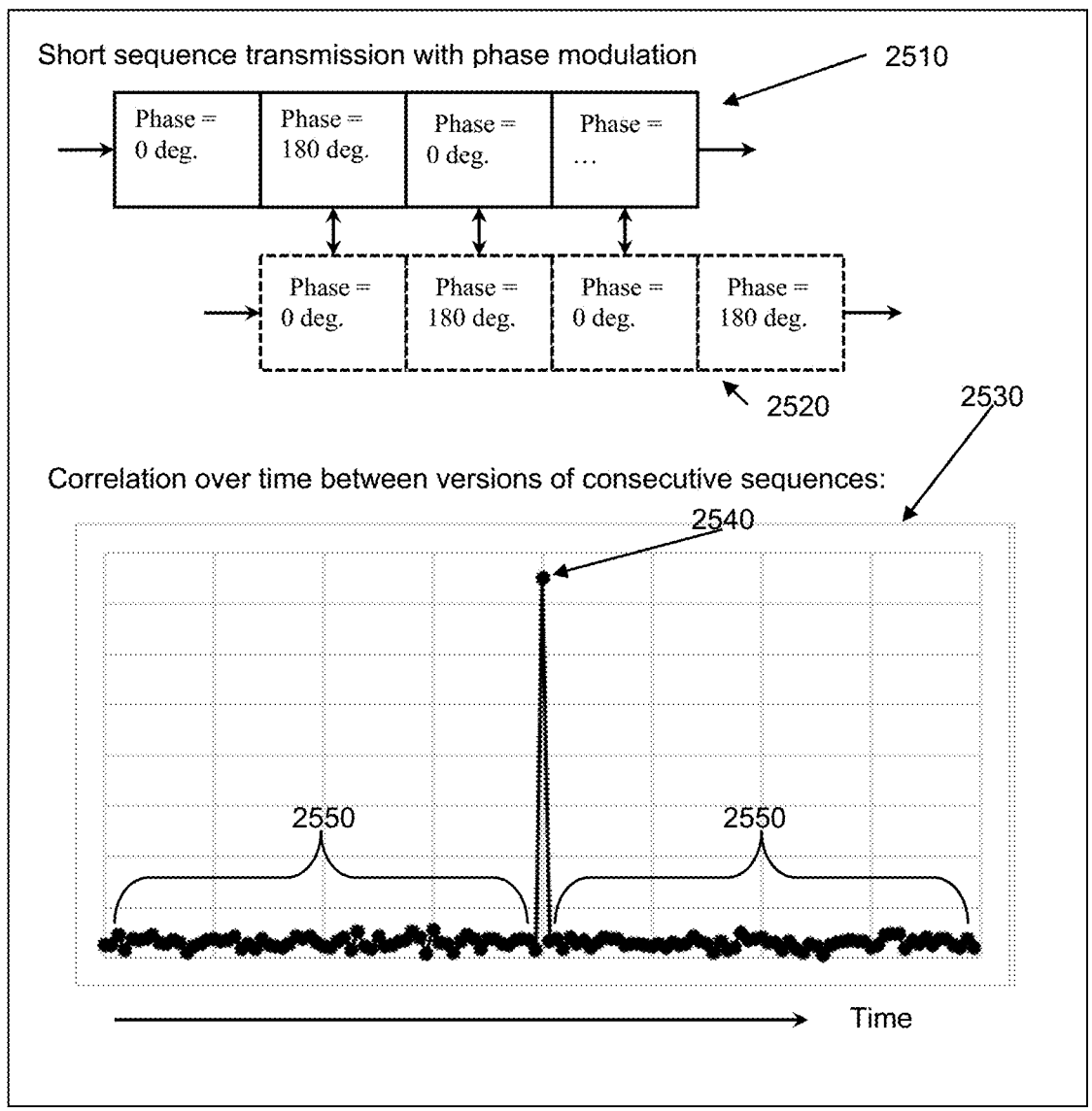
FIG. 25 is a schematic diagram showing the correlation between replicas of a waveform transmitted with phase modulation in the segments according to one embodiment of the subject invention.

Similarly, out-of-phase autocorrelation levels can also be reduced by modulating phase offsets in the short sequences. FIG. 25 illustrates 16 short sequences represented by 2510 and 2520 with phase modulations. With phase modulations inserted in the waveform, the autocorrelation function 2530 can be as shown in FIG. 25, where a single peak 2540 dominates. That is, as shown in FIG. 25, in-phase autocorrelation peak 2540 has a significantly higher magnitude than the out-of-phase autocorrelation peaks 2550. The effectiveness of modulating the phase offsets can be dependent on the coherence of the gateway receiver as described below with reference to FIG. 24.

With the inclusion of time spacing, several alternatives exist for what to transmit in the time spaces. For example, 'no energy' could be transmitted or the chips in the preceding short sequence could be repeated (in the time spaces). Another option in the implementation of time spacing could be to use 'non-integer offsets'. Non-integer offsets have the advantage of producing more randomness with less average time spacing. Non-integer offsets also have the disadvantage of introducing inter-short-sequence interference when the time spacing is short (i.e., a few chip periods). For the case where energy is transmitted in the time spaces, the impact of inter-short-sequence interference can be more significant. In this example, the total impact on transmission time is an increase of approximately 1%.

Figure 23:
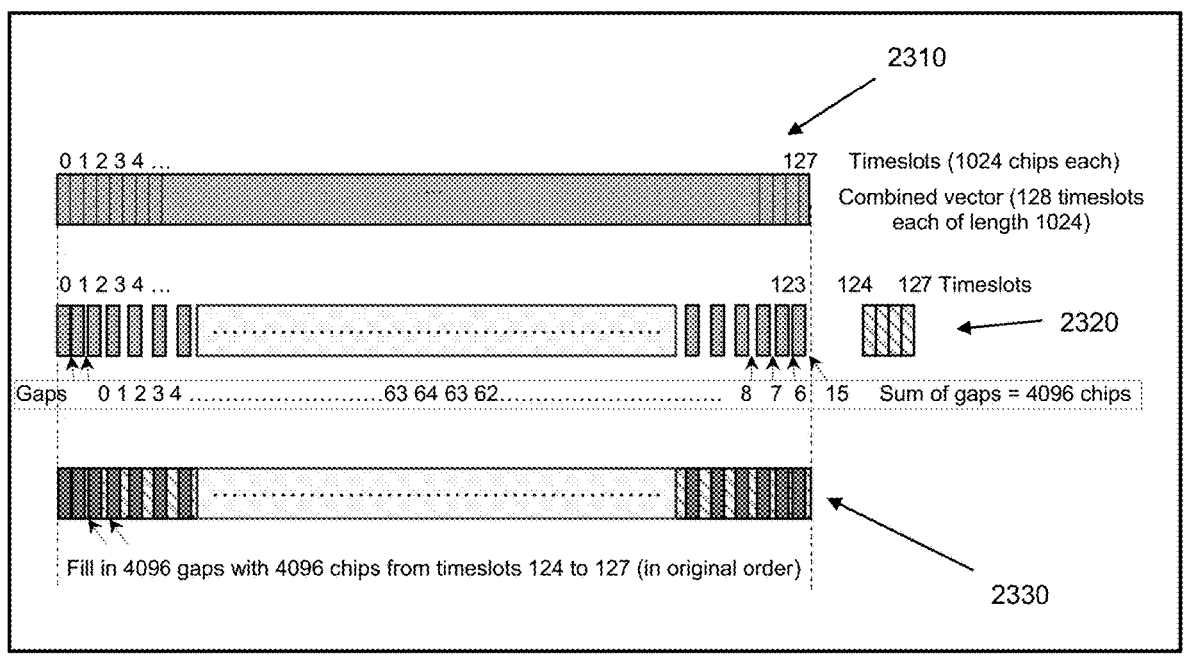
FIG. 23 is a schematic diagram showing linearly increasing and decreasing time shifts with back-filling of the final 4 timeslots according to one embodiment of the subject invention.

Another option is 'back-filling of gaps.' In this type of implementation of time spacing, the bursts are transmitted in the same total time as the burst without time spacing. This could be done, for example, by taking the modulated chips from the end of the burst and placing them in the gaps. Back-filling has the advantages of maintaining the length of the burst without time spacing and avoiding the issue of how to fill the gaps. Back-filling can, however, be disadvantageous in that fewer complete pilot sequences are available for detection of the burst. The following example illustrates the application of back-filling:

- FIG. 23 (at the top 2310) shows a burst with 128 timeslots and without time spacing.
- Time gaps are introduced 2320 with lengths starting at 0, and increasing by 1 in each gap, up to length 64 and then decreasing back to 6. The first 124 timeslots fit within the length of the burst without time spacing.
- The content of the remaining 4 timeslots is then placed, in order (chip-by-chip), in the gaps 2330. As such, the resulting length matches that of the burst without time spacing.
- The detection process, therefore, has visibility to 124 complete pilot sequences vs. 128 without time spacing, corresponding to an energy reduction of ~0.14 dB.

As described above, in embodiments of the invention, time spacing in a pilot waveform is primarily used on bursts sent by satellite terminals and received by a gateway station (satellite hub). Operation of the receiver at the gateway for various embodiments of the invention is illustrated in FIG. 24. Bursts transmitted from terminals could arrive at the gateway receiver at any time. Once a burst is detected, it is passed to a demodulator and decoder where the content is determined. In operation, the gateway receives samples with a timeslot at step 2410. The received samples are usually received by the gateway at a rate of 4 or 8 times the chip rate. These samples are typically matched filtered. The samples are then coherently correlated (at step 2430) with the expected Pilot samples at each of several frequency hypotheses. For example, with approximately 22 Hz spacing and +/−300 Hz of search range, the number of frequency hypotheses could be 28. The resulting correlation values can then be recorded.

The recorded correlation values corresponding to a hypothesized burst (e.g., including 124 Pilot sequences) can then be combined (at step 2440) to generate a metric. The combination can include both coherent (where the phase differences between short sequences are considered) and non-coherent (where the amplitude of correlations are summed) components. For example, groups of four sequentially received short sequence correlations may be coherently combined, and the ~32 results may be non-coherently combined. The metrics, which are typically normalized, can then be compared to a threshold at step 2450, potentially resulting in declaration of bursts detection.

After burst detection, the associated samples could then be demodulated and decoded. By setting the phase of the individual short sequences, the probability of matches between simultaneous transmissions can also be reduced. The phase setting could be in 180-degree steps (i.e., inversion of the chips), or it could be in other steps, e.g., 90-degree. The receiver at the gateway may or may not take account of the phase of the Pilot waveform during detection and is more likely to do so for short sequences that are nearby in time. A combination of both pseudo-random time spacing and phase inversion can result in robust detection, including framing. As such, this combination can offer an attractive approach to transmission of bursts from terminals for narrow-band short messages. For example, using the burst embodiment described herein, the combination of pseudo-random time spacing and phase inversions can result in an improvement in the probability of detection of bursts of approximately 2 dB, given a constant false alarm rate.

One feature of embodiments of the invention is the ability to identify terminals based on the time-of-arrival at the network of bursts sent by the terminals. Terminals can use estimates of the distance to the satellite from their location to correct the transmit timing such that bursts arrive at the time corresponding to a particular location such as the time center of a beam (half way between the closest and farthest points in a beam from the satellite). Terminals with degraded location estimates may transmit with timing errors. In beyond-worst-case conditions, this timing error could reach a range in the order of +/−28 ms.

The beams at the edge of coverage (where terminals see the satellite at the lowest elevation) can have higher variation in the distance to the satellite relative to beams that are closer to the sub-satellite point. The worst-case beams can have edges with zero degree elevation towards the satellite. Note that systems typically aim to provide service at higher elevations (e.g., 20 degrees and above). However, it could be useful to enable operation at lower elevations. The width of beams is near fixed as seen from the satellite. Maximum diameters of existing spot beams can be approximately 1.25 degrees. A terminal can typically determine its location (based on GPS or SNR measurements) within 0.25 beam widths. A beyond-worst-case assumption, therefore, could be that a terminal could have a position estimate that is 50% of the beam's diameter beyond a beam's edge when its actual location is 50% of the beam's diameter on the opposite beam's edge. This could result in a one-way delay range of around 14 ms. As terminal's base their transmit times on the received time of network-originated signals, the range of reception time at the satellite (and network) could be approximately 28 ms, assuming a fixed receive-to-transmit time offset at the terminal. With the terminal adjusting its transmit time (to target correct timing) the delay could range over +/−28 ms (a 56 ms range).

At nominal rates (23.4 kcps), the minimum separation between transmission opportunities could be ~11 ms. To ensure that bursts can be received without ambiguity in a receive timing window, a means for distinguishing each of every 8 bursts could be needed. This would support an error range of up to ~88 ms, where the requirement is ~56 ms. The mechanism for distinguishing the bursts could take any of several forms. This set of options can be referred to as a set of distinguishable code patterns. A low-complexity, robust example of a code pattern can be to apply masks to the CRC included in each burst. That is, the 3 least significant bits of the timeslot index can be mapped to a mask for the CRC. It may also be possible that other status information could use the mask, such as a single bit to distinguish prearranged bursts from non-prearranged bursts.

By way of example, the CRC mask could be generated as follows: the 3 bits associated with the timeslot index can be appended to a $4^{th}$ bit indicating the presence of a non-preassigned burst. These 4 bits could be placed in the least significant 4 bits of an 8-bit value, with the other bits set to zero. The 8-bit result could be repeated to generate a 16 bit mask to be applied to the CRC (via eXclusive OR, XOR combination).

When receivers determine SNR estimates, account can be taken of the nature of any sharing the communication channel might imply. Three parameters could be passed from the network to the terminal. They are: 1) a flag to indicate whether the channels are shared; 2) an indication of the minimum duration of the interfering signals (e.g., 5 ms); and 3) an indication of the EIRP of the interfering signal (e.g., 40 dBW). These parameters could be passed to the terminal through the broadcast System Information or through individual control messaging.

A terminal could use this information to assist in excision of the interference from a received signal. For example, assuming a 5 second observation, 20 ms burst length, and a 40% duty cycle in the interferer, the terminal would typically see 3 seconds of received waveform in which the interferer is not present. It could use the minimum duration as a basis for excision. The EIRP could be used to further enhance the power control as the received level could be used to independently estimate the attenuation in the link.

Figure 18:
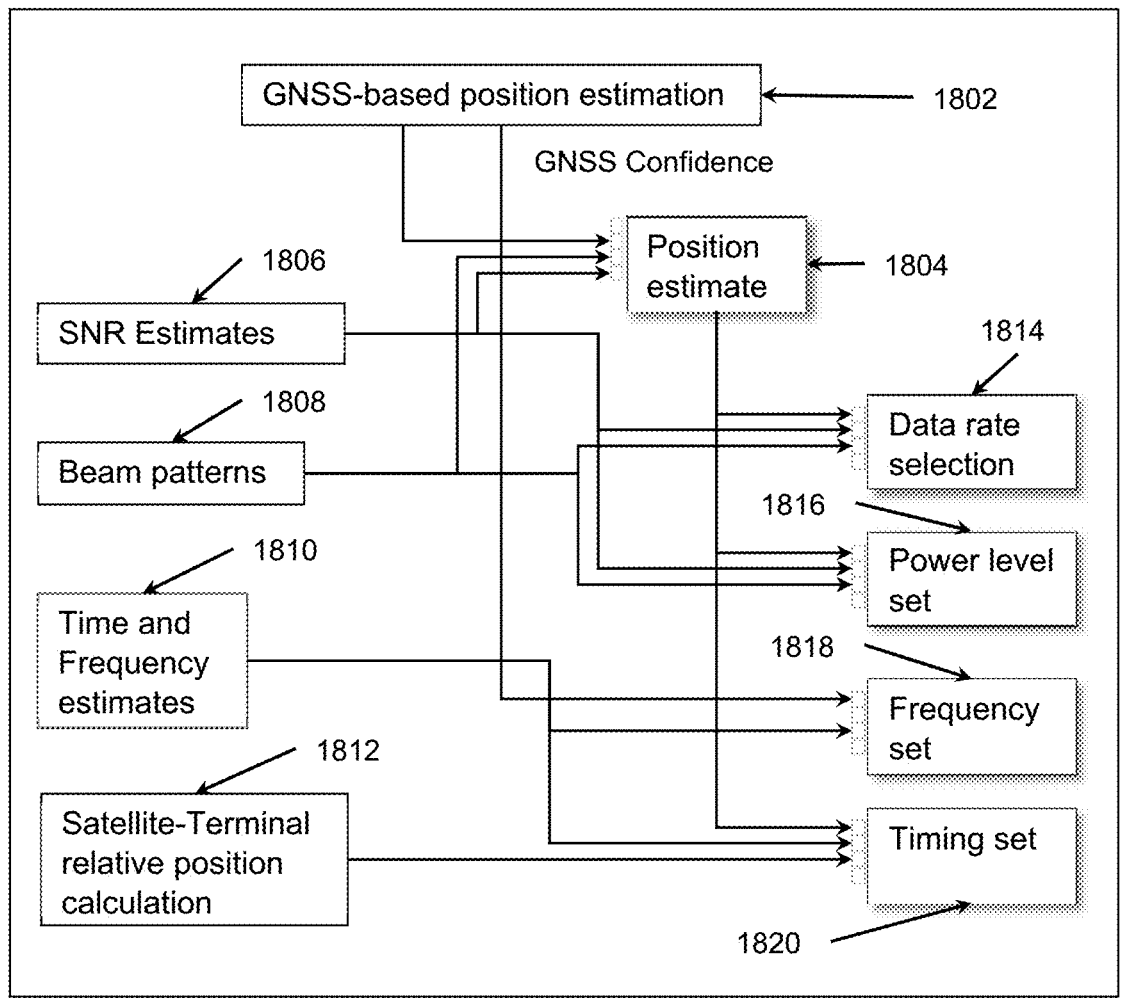
FIG. 18 is a schematic diagram showing factors which can be used to derive various parameter settings for the terminal according to one embodiment of the invention.

FIG. 18 illustrates the various information that can be used when determining terminal characteristics. For example, the GNSS-based position estimation 1802, SNR Estimates 1806, and Beam patterns 1808 can all be used when determining a position estimate 1804. The Position estimate 1804, as well as SNR Estimates 1806, and Beam patterns 1808 can be used to determine data rate selection 1814. The Position estimate 1804, SNR Estimates 1806, and Beam patterns 1808 can also be used to determine the terminal initial power level setting 1816. The GNSS-based position estimation 1802 and Time and Frequency estimates 1810 can be used to set the frequency 1818. The position estimate 1804, Time and Frequency estimates 1810, and Satellite-Terminal relative position calculation 1812, can be used to set the timing 1820.

Figure 5:
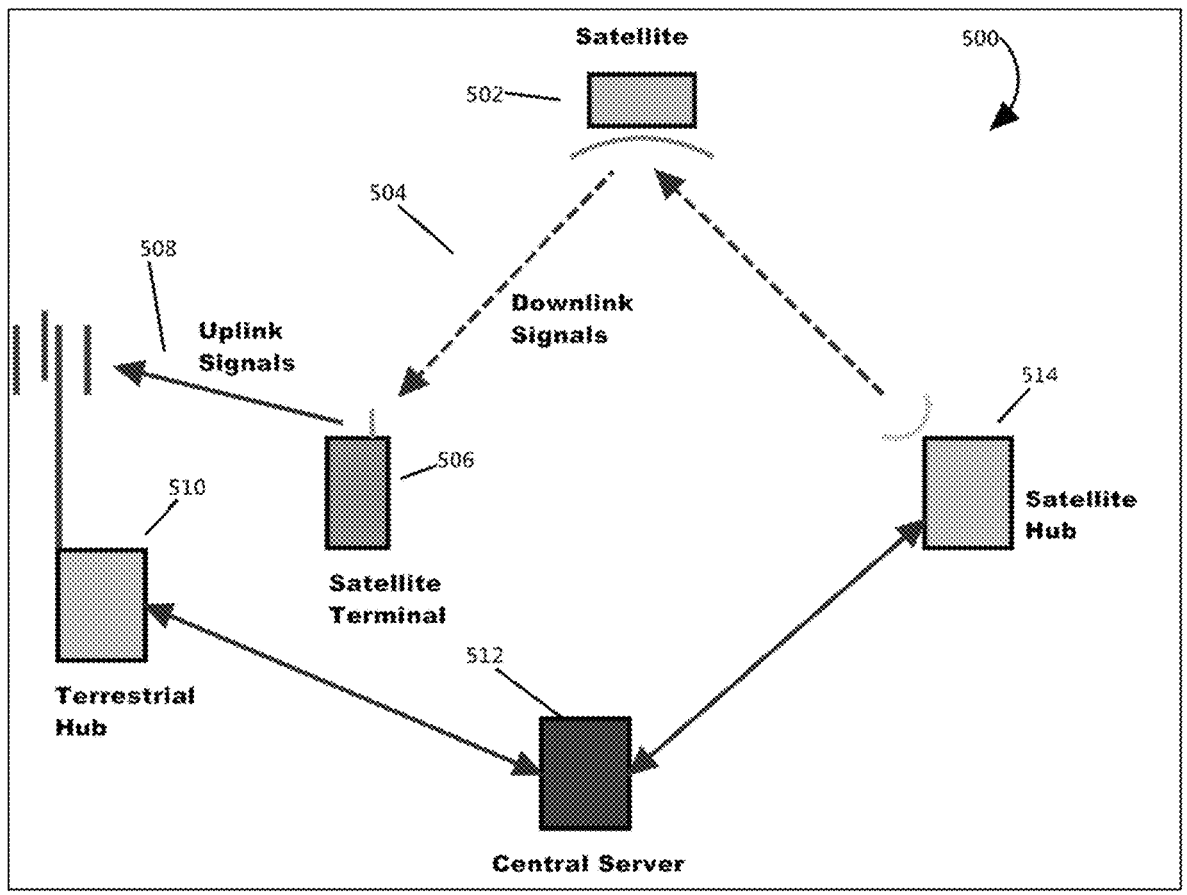
FIG. 5 is schematic diagram of another embodiment of a satellite communication system according to the present invention showing a terrestrial hub in the satellite communication system.

In some instances, particularly when the number of satellite terminals within a beam is large, it may be advantageous to provide a terrestrial receiver for the satellite terminal transmissions. FIG. 5 illustrates an embodiment of a satellite communication system 500 in which a satellite terminal 506 receives downlink signals 504 from a satellite 502 but transmits 508 to a terrestrial hub 510. This architecture can be particularly advantageous to applications, such as utility metering, in which most of the communications traffic is in the direction from satellite terminals 506 to a central server 512. In this embodiment, information from satellite terminals, such as 506, within wireless communications range of the terrestrial hub 510 could be received by the terrestrial hub 510. Terrestrial reception could use the same terminal transmit channel as that used for the satellite link. The terrestrial hub 510 could be configured to be aware of the delay to the satellite 502, and thus could determine the expected time and frequency of received bursts. As such, the satellite terminal 506 need not be aware of terrestrial reception.

The terrestrial hub 510 can be configured to change the satellite terminal 506 transmit power to match the needs of terrestrial reception. In many cases, this can result in significant power reduction. The power change can be implemented in a number of different ways. For example, the power change can be a gradual adjustment after each transmission or the power can be adjusted via a paged exchange where the terrestrial hub 510 individually instructs (via the central server 512, the satellite hub 514, and the satellite 502) each satellite terminal 506 to make a change in power. The range of power control of the satellite terminal 506 to support satellite operation can be typically approximately 15 dB. For terrestrial operation, the required range can increase to approximately 80 dB due to the variation in path loss in a terrestrial environment. The dynamic range can be reduced in a number of ways such as using higher data rates when transmitting close to the terrestrial hub 510 or using multi-user detection at the terrestrial hub 510 to reduce the sensitivity to the difference in received power levels between terminals 506.

In another embodiment, communications in both directions may be provided terrestrially, such as when the volume of traffic in both the uplink and downlink directions becomes large. As shown in FIG. 6, the terrestrial hub 610 and satellite terminal 606 can be configured to communicate in both the uplink 608 and downlink 604 directions terrestrially. The terrestrial hub 610 and satellite terminal 606 can be configured to use additional channels. As conventional satellite systems may use Time Division Multiple Access (TDMA) within each beam (and frequency reuse over several beams), the number of channels available for terrestrial Code Division Multiple Access operation with a beam could be a sizable portion of the satellite system's 600 available spectrum.

Figure 7:
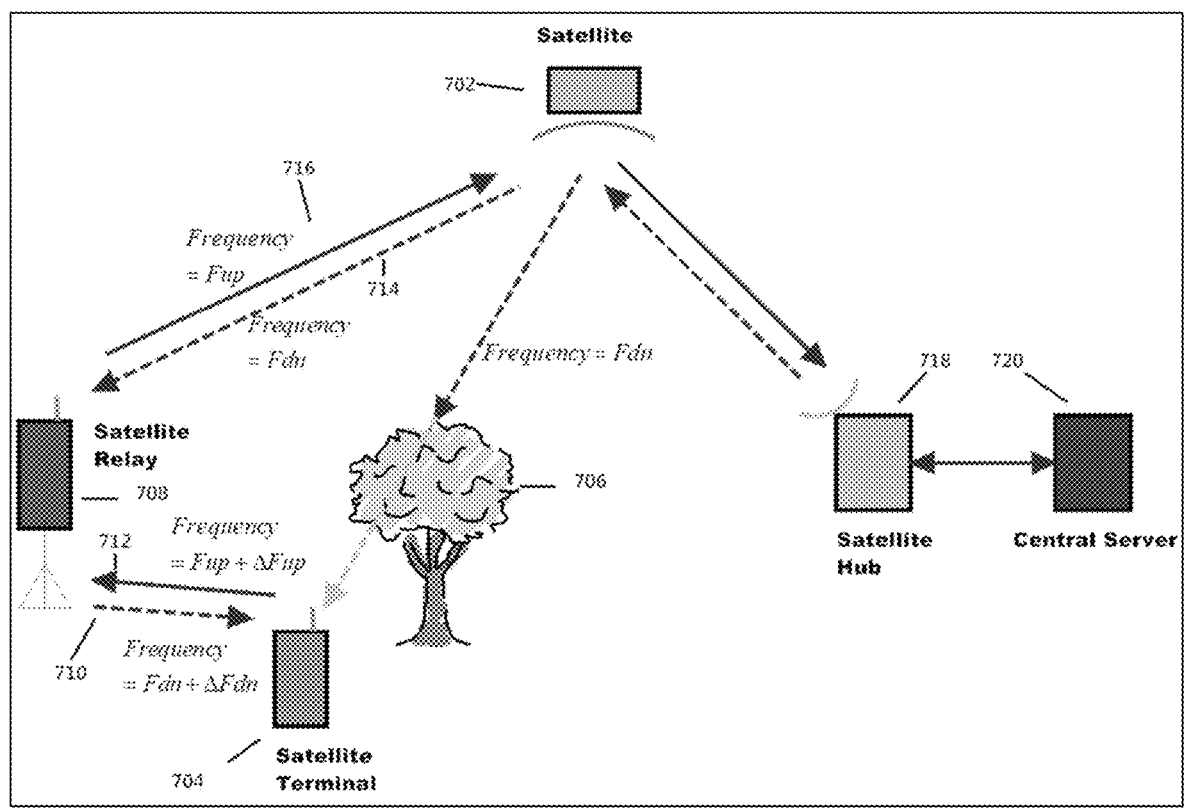
FIG. 7 is a schematic diagram of another embodiment of a satellite communication system according to the present invention showing a satellite relay in the satellite communication system.

In general, a satellite must have line-of-sight access to a satellite terminal in order to communicate with the satellite terminal. As shown in FIG. 7, a satellite terminal 704 may be shadowed from a satellite 702 if the line of sight between them is obscured, such as by a tree 706 or other obstruction. Embodiments of the invention can include terrestrial relays 708 which are ground-based transceivers that provide links 710, 712 to a shadowed satellite terminal 704.

A terrestrial relay 708 can be configured to receive forward link 714 communications in one or more channels from a satellite 702. The terrestrial relay 708 can then retransmit the content to the shadowed satellite terminal 704. Retransmission can occur at another frequency within the allocated forward link band, but typically not used directly from the satellite 702 within the beam containing the terrestrial relay 708. For example, the terrestrial relay 708 may receive forward link 714 communications from the satellite 702 at a carrier frequency of Fdn and then retransmit 710 the information to the shadowed satellite terminal 704 at a carrier frequency of Fdn+$\Delta$Fdn.

Similarly, the terrestrial relay 708 can also be configured to transmit return link communications 716 to the satellite 702. The terrestrial relay 708 can receive return link signals 712 from the shadowed satellite terminal 704, frequency shift the received signals, and retransmit the frequency shifted 716 to the satellite 702. For example, the return link carrier frequency may be transmitted at a carrier frequency of Fup+$\Delta$Fup from the shadowed satellite terminal 704 and the terrestrial relay 708 may convert the carrier signal to Fup for retransmission to the satellite 702.

The frequency offsets ($\Delta$Fdn, $\Delta$Fup) applied to both the forward link 714 and return link 716 can be advertised in the broadcast system information. In addition, the signals passing through the terrestrial relay 708 in both the forward link 714 and return link 716 can also have a fixed delay. For example, the delay may be set at 0.1 ms (with a tolerance of 5 µs). The shadowed satellite terminal 704 can be aware of the delay in the terrestrial relay 708 (as this is either a system constant, or a period defined in the broadcast system information) and can also be aware that they are using a terrestrial relay 708 (as the frequency of the forward link 710 coincides with a relay assignment). The shadowed satellite terminal 704 can adjust its transmit timing such that its transmissions arrive at the satellite 702 at an intended time (i.e., the central server 720 and satellite hub 718 need not be aware that the shadowed satellite terminal 704 is operating via a terrestrial relay 708). Alternatively, status messages from the shadowed satellite terminal 704 may inform the central server 720 whether or not it is operating via a terrestrial relay 708.

The terrestrial relay 708 does not need to modify the content of data passing through it. The terrestrial relay's 708 primary function can be carrier frequency conversion. In addition, the shadowed satellite terminal 704 may be configured with sufficient margin in its scheduling of events to reduce the delay between reception and transmission of signals. For example, with a fixed delay of 0.1 ms in each direction in the terrestrial relay 708, the change in delay at the shadowed satellite terminal 704 could be 0.2 ms.

Figure 8:
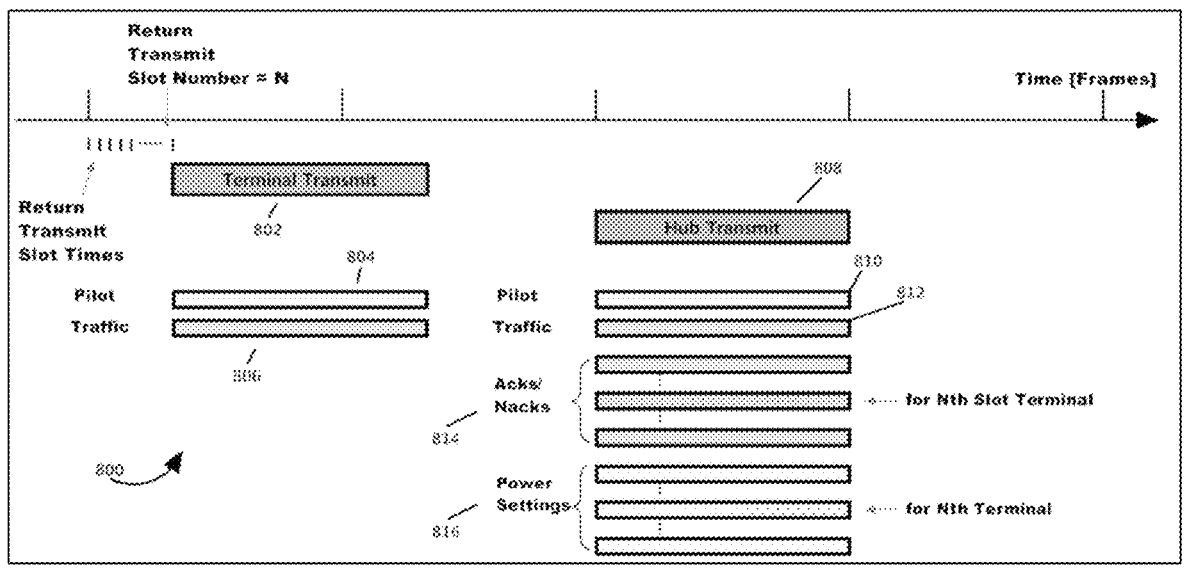
FIG. 8 is a schematic diagram showing signaling elements contained in a burst involved in a scheduled transmission according to one embodiment of the subject invention.

As described above, in various embodiments of the subject application, satellite terminals can communicate with network infrastructure using scheduled burst transmissions that are intended to communicate a complete message without all the overhead used in establishing and terminating a connection associated with conventional satellite communication systems. FIG. 8 illustrates one exemplary scheduled transmission communication 800. During scheduled transmissions, a satellite terminal transmits a burst 802, where the content of the burst comprises a pilot 804 and traffic 806. The central server can respond with a hub transmission 808, which can contain responses to all the satellite terminals that have transmitted over the period of a frame. The hub transmission 808 can include pilot and traffic signals 810, 812, as well as acknowledgements 814 and power settings 816.

In various embodiments of the invention, the acknowledgement information can be modulated. During each frame, the number of satellite terminal scheduled transmissions will be less than 256 (i.e., corresponding to the number of orthogonal Walsh codes). As such, in the corresponding forward link frame, fewer than 256 acknowledgements (and 256 power control signals levels) can be transmitted. A single (normal) Walsh code can be assigned for acknowledgements and another single Walsh code can be assigned for power control levels. Note that there are 512 coded bits where each of those is modulated by a normal Walsh code within each burst. There can be two distinct categories of Walsh code based spreading sequences: Normal Walsh codes (i.e., of length 256 for the most robust case) used to modulate each coded bit; and Long Walsh Codes, used to generate orthogonal sequences over the whole burst (i.e., of length 512) where each bit applies to a symbol. To transmit a binary value over the duration of a burst (e.g., ACK/NACK) a specific Long Walsh Code can be assigned to each satellite terminal. The mapping from Long Walsh Codes to satellite terminals can be based on the return transmit slot index. The 512 possible Long Walsh Codes are more than sufficient to support the number of satellite terminals which is less than 256 in number.

As the target Frame Error Rate (FER) falls below 1%, the expected ratio of ACKs to NACKs is at least 99:1. To conserve satellite power, it would be beneficial to minimize the total energy needed to transmit the combination of ACKs and NACKs. Received signals can be passed through a matched filter, synchronized in time and frequency, and correlated with the known spreading sequences. The result can be viewed as a baseband equivalent 2-dimensional vector called a correlation vector.

Figure 9:
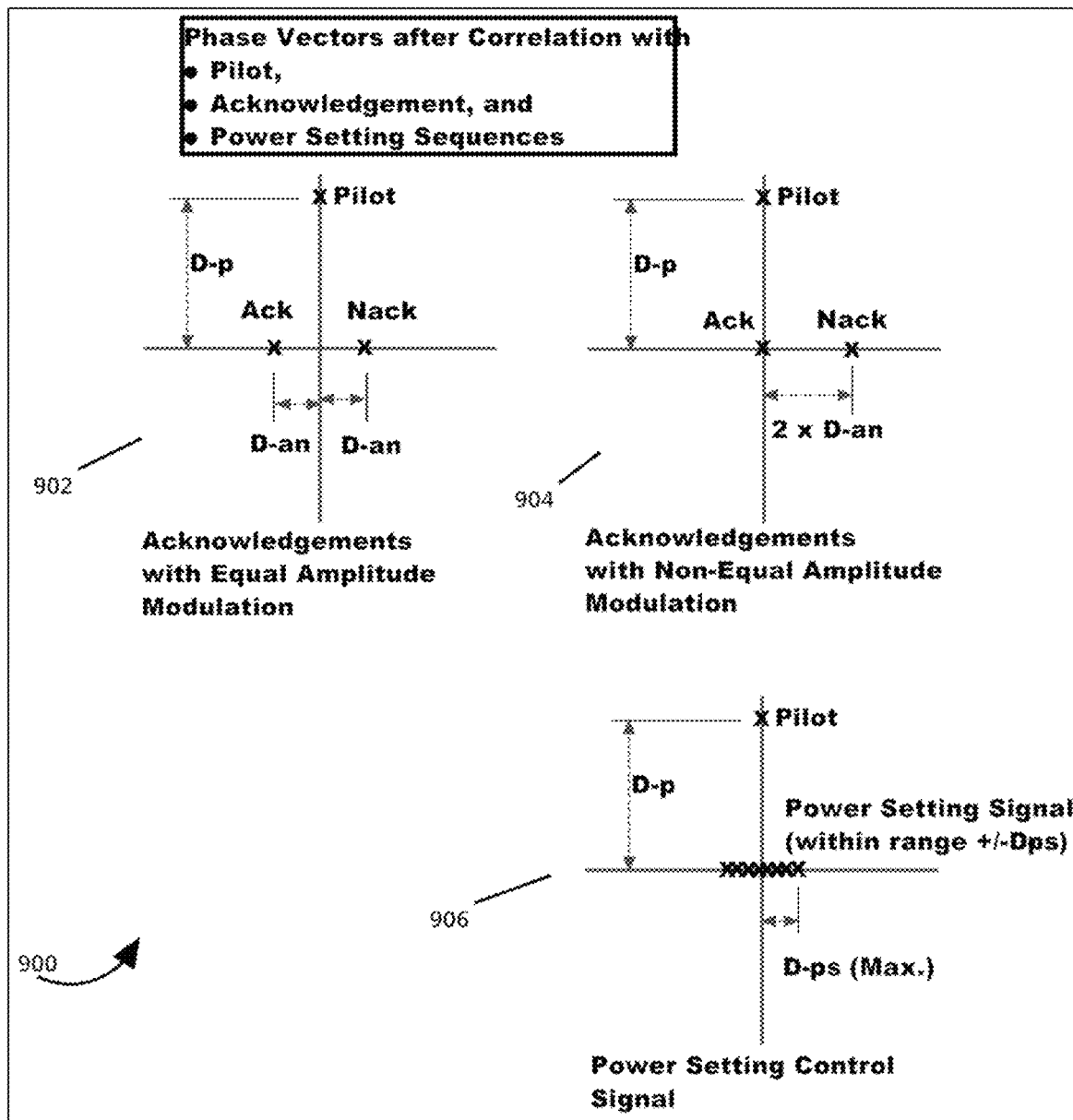
FIG. 9 is a schematic diagram showing modulation and acknowledgement and power setting information for scheduled transmissions according to one embodiment of the subject invention.

FIG. 9 illustrates exemplary acknowledgement 902, 904 and power setting 906 correlation vectors without noise or other impairments. To achieve a desired error rate in the acknowledgements, the distance in correlated vector space between the constellation point associated with an ACK and that associated with a NACK should exceed a minimum length. In one embodiment 902, which shows an example with equal amplitudes for ACK and NACK modulation, this distance can be 2×D-an. One of the key drivers of the error rate can be the distance between the points, not their locations. The location of these constellation points in correlation space is a degree of freedom, allowing the vectors to be moved such that the total associated energy can be minimized. For example, the associated power may be 99×P-ack+1×P-nack, where P-ack and P-nack are proportional to the square of the amplitude of each vector. As there are many more ACKs than NACKs, average power can be reduced by reducing P-ack and increasing P-nack. Average power is minimized when P-ack is close to zero. In the case illustrated (with P-ack set to zero) by 904, the NACK-related correlation vector has twice the amplitude D-an; meaning that P-nack is 4 times what it would be if P-ack=P-nack as shown by 902. The average power required to transmit acknowledgements for case 904 is about 4% of that required for case 902, which equates to a reduction in power of approximately 96%. To achieve this performance, the decision threshold between the ACK and NACK related constellation points should be known. As the acknowledgements are transmitted in the presence of pilot signals, the receiver can be configured to calibrate the location of the decision threshold.

The error rate for the acknowledgement process is typically significantly better than for data traffic. For example, the acknowledgement process error rate can be lower than 0.1%. At the same time, the error rate for NACKs can be traded against that for acknowledgements ACKs. This trade can be driven by the relative costs of a mistake. For example, a NACK received as an ACK can result in failure to communicate the message, while an ACK received as a NACK can result in an unnecessary retransmission (which would typically have less impact). According to various embodiments of the invention, the acknowledgement process can be implemented using existing physical bearers, without specific changes to the physical layer design to improve efficiency.

Initialization of communication between satellite terminals and the central server can be accomplished in a number of different ways. For example, scheduled satellite terminal transmissions can be used where a predefined time is established at which the satellite terminal would transmit a fixed length message. A typical embodiment of this type can be used in many different applications, such as, for example, regular utility meter readings. Another exemplary embodiment can use alarm-driven satellite terminal communications. In these embodiments, some event at the satellite terminal can initiate an exchange of information. For example, opening a door can trigger an alarm that would begin an information exchange. In still another embodiment, paged communications can be used in which the central server initiates an exchange of information. One sample application of this type of embodiment could be used to change parameter settings in the satellite terminal.

Each satellite terminal can have a unique associated identity, denoted by a Mobile Device Identity (MDI), which can be a 64-bit value. During operation, a satellite terminal can also be assigned a Temporary MDI (TMDI), which can be shorter, such as a 24-bit value. During alarm-driven communications the related satellite terminal will identify itself, and for paged communications the satellite terminal can be identified by the central server. This identification can be provided by the TMDI. During scheduled transmissions, the satellite terminal can be aware of the transmission time and the central server can be aware of the identity of the satellite terminal that is configured to transmit at the scheduled time. The central server can identify the satellite terminal without having to read information from the content of the transmission. In other words, identity information need not be included in the transmitted information. For example, in a burst containing 112 payload bits, the application-related information can be increased by 27% by avoiding the transmission of 24-bit identity information. In addition, each satellite terminal can be configured to apply unique ciphering to its transmitted data, providing another means of confirming the identity of a source satellite terminal.

When a satellite terminal powers up, it can acquire and synchronize to the forward link channels of a satellite. This can be accomplished in a number of ways. For example, with typical acquisition algorithms, the satellite terminal can detect the presence of a pilot channel, which can be used to determine estimates of the carrier frequency and timeslot timing. The start time of each timeslot can be resolved, but the location within each frame and the frame number are typically not determined by the acquisition algorithm. The BCCH can then be observed so that the frame boundaries can be determined.

Figure 10:
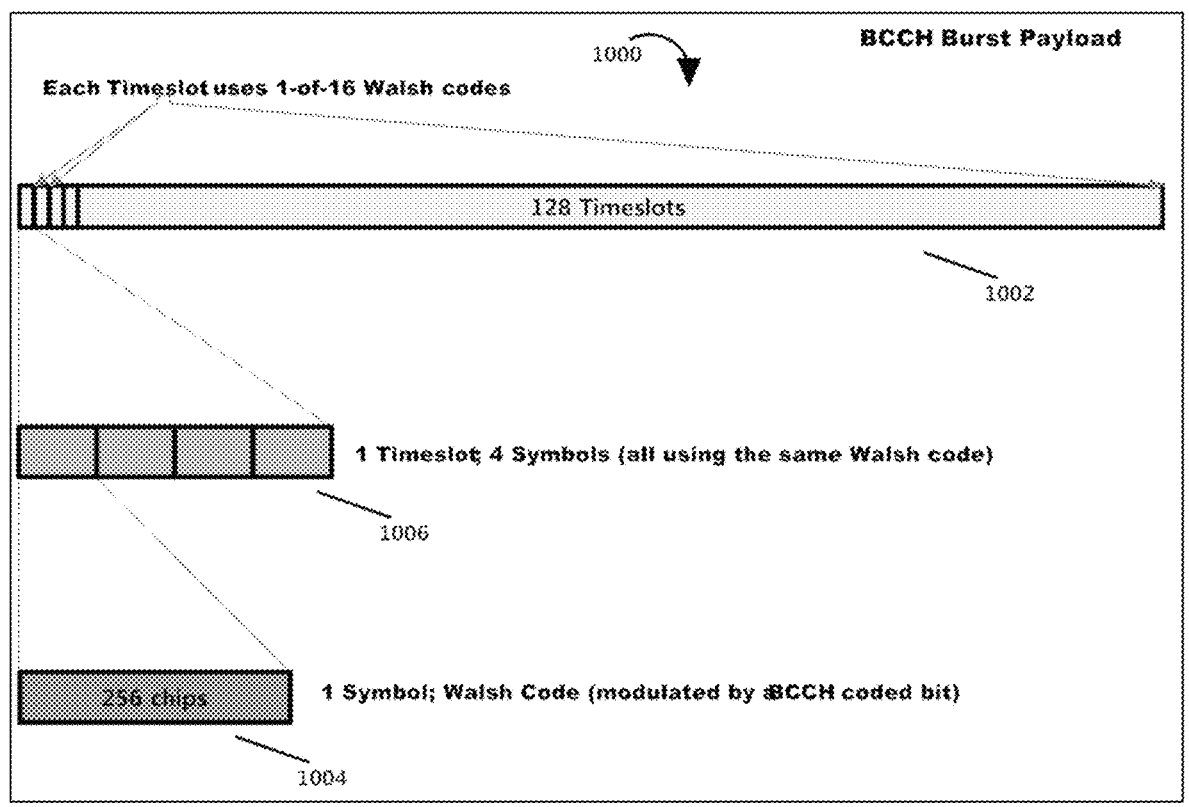
FIG. 10 is a schematic diagram showing the payload content of a BCCH burst according to one embodiment of the subject application.

FIG. 10 illustrates one exemplary BCCH payload structure 1000 according to various embodiments of the invention. The BCCH can use multiple known Walsh codes, transmitted in a known sequence, while modulating the payload information. By searching for correlation with the expected pattern of Walsh codes, framing of the forward link can be resolved. As such, a separate synchronization channel is not needed thus saving satellite power. As shown in FIG. 10, each BCCH burst payload can consist of 128 timeslots 1002, each of which can contain four Walsh codes 1004 associated with four coded BCCH bits 1006. The boundaries of the timeslots can be resolved as described above. The same Walsh code can be used for the 4 symbols of each timeslot. Over the 128 timeslots, 16 different Walsh codes can be used. The Walsh codes can be arranged in a pseudo-random pattern that can be selected with the goal of maximizing the distance between the correct framing and any offset of that framing by an integer number of timeslots. After establishing framing, the content of the BCCH can be received and the frame numbering can be read from system information.

Different satellite terminals can have different capabilities in part because applications associated with each satellite terminal may have different requirements. For example, a mobile terminal, such as one used for tracking a vehicle may have different capabilities and requirements than a stationary terminal, such as one used for utility metering. The parameters of protocols and other terminal characteristics established by the central server can depend on awareness of these capabilities. Additional differences may arise as the system evolves and terminals with newer capabilities are introduced. However, because the capabilities associated with satellite terminals in embodiments of the invention can be mapped to their identities (MDIs), there is no need to exchange information related to terminal capabilities. When transmitting information, the formatting of data may depend on the associated application, such as information related to electric meter reading or vehicular asset tracking. However, in embodiments of the invention, there is no payload overhead for defining field sizes, locations, etc. because the formatting of scheduled transmissions (and others) can also be mapped to terminal MDIs.

According to various embodiments of the invention, satellite terminals can be configured to support applications that transmit data at pre-defined times based on regularly-spaced intervals, but where the precise time of the transmission is not critical such as utility meter readings. Other services, such as voice links, provided by a satellite can involve concentrations of throughput at specific times of day, such as during times of heavy voice traffic. Typically, satellite terminal transmissions will be scheduled to avoid predicted busy hours. However, in some cases, satellite capacity may approach its limits due to unforeseen events. Under such conditions, scheduled transmissions can be reassigned based on parameters delivered via system information which can be read by the satellite terminals prior to transmission. This reassignment process, called scheduled transmission quietening, enables delaying of selected scheduled transmissions for a period of time. When rescheduling, a defined timeframe can be cleared of scheduled transmissions and transmissions can be rescheduled over the following hours. After conditions change, the system can return to normal operation. Scheduled transmission quietening can be used to efficiently enable management of satellite resources without individually changing the transmission schedules of every impacted satellite terminal.

In order to implement scheduled transmission quietening in embodiments of the invention, three system information parameters can be used to define the real-time communication status. A scheduled transmission quietening active flag (SI_quiet_flag) indicates that scheduled transmissions should not be transmitted. This flag can be set to stay active for a specified amount of time such as 2 hours. Additional parameters are used to define the configuration of quietening. One parameter (SI_ELMT_quiet_period) can be used to define a period of time (the quietening delay) that is equal to or longer than the period of quietening, where the parameter's 4-bit value is in units of 512 frames. A second single bit parameter (SI_ELMT_quiet_spread) can be used to define whether the retransmissions are spread over 4 quietening delay periods or 8 quietening delay periods. The selection of which of the 4 (or 8) quietening delay periods to use for the retransmission can be based on the Least Significant Bits of the terminal temporary identity (TMDI), which is a number known to both the terminal and the infrastructure.

Figure 11:
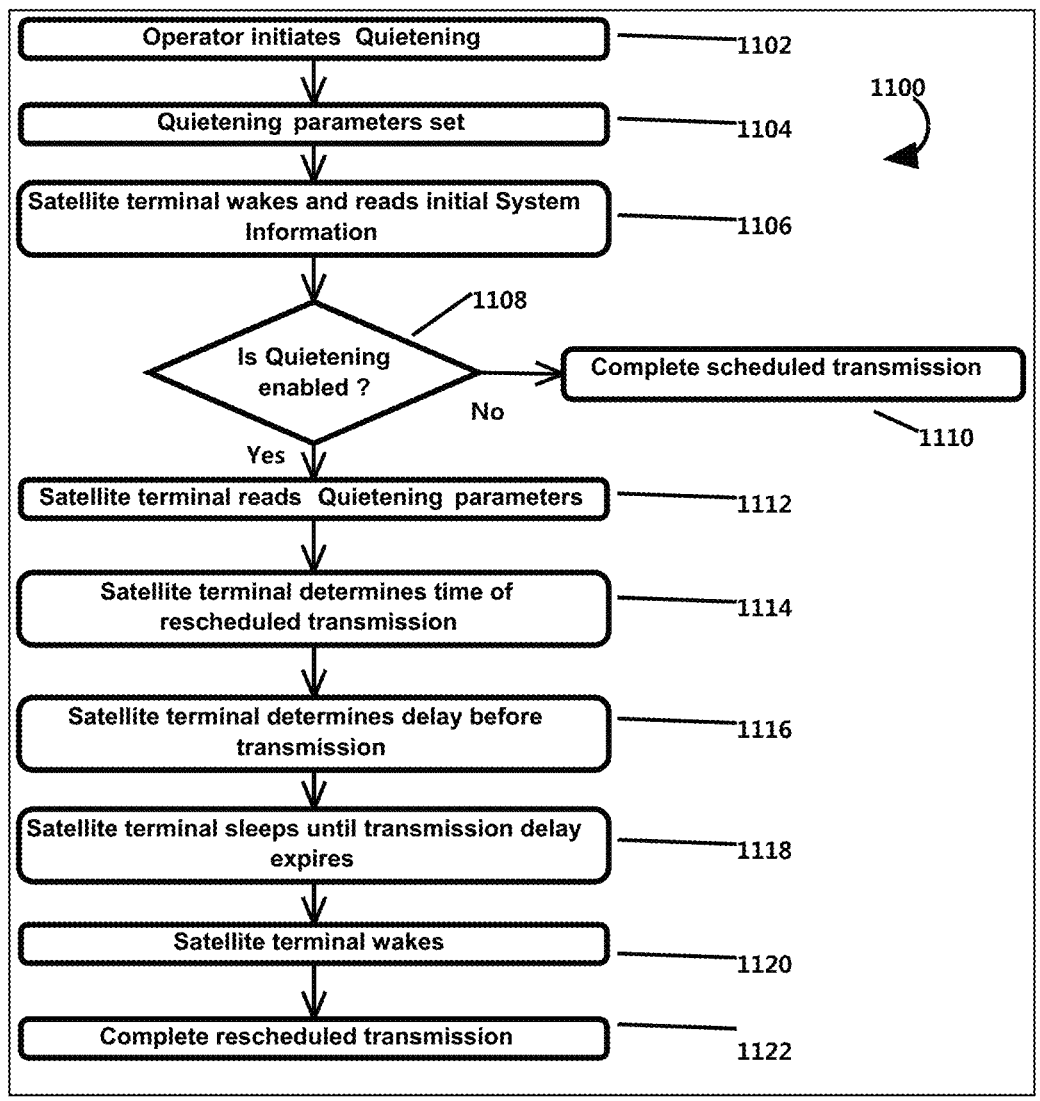
FIG. 11 is a flow chart illustrating an exemplary quietening process in terms of frame numbers according to one embodiment of the subject invention.

FIG. 11 illustrates an exemplary quietening process 1100. An operator may initiate a period of quietening that can be applied to scheduled transmissions at 1102. In doing so, the operator sets the quietening parameters which are entered into the System Information broadcast in the BCCH at 1104. For example, a period of 1.5 hours can be selected during which scheduled transmissions should be disabled (e.g., 9:00 PM-10:30 PM). In addition, the quietening delay can be set (via SI_ELMT_quiet_period), such as for 2 hours, and the number of delay steps after quietened transmissions can be set (via SI_ELMT_quiet_spread), such as for 4 times. Next a satellite terminal will wake up at 1106. The satellite terminal then determines whether or not quietening is currently enabled by reading the System Information entry, SI_quiet_flag, at 1108. If quietening is not enabled, the satellite terminal proceeds with its scheduled transmissions at 1110. If quietening is enabled and the satellite terminal has an assignment for a scheduled transmission during the quietening period, such as 10:05 PM, the satellite terminal can read the quietening parameters from the system information at 1112. The satellite terminal can then determine the rescheduled transmission time, at 1114, based on the quietening parameters. In order to do so, the satellite terminal can select a number between 1 and the number of delay steps after quietened transmission parameter, which, in this example, is 4. A deterministic reference known to the central server, such as Least Significant Bits of the TMDI, can be used to selecting the number. For example, in this case, the selected number may have a value of 3 (i.e., between 1 and 4). The transmission delay can then be calculated by multiplying the selected number (plus 1 to include the quietened period) by the quietening delay. In this case, since the quietening delay is 2 hours, the calculated delay is determined to be 8 hours or until 6:05 AM. After calculating the transmission delay, the satellite terminal goes back to sleep, at 1118, until the delay expires. At 1120, after the delay expires, the satellite terminal wakes up and, at 1122, the rescheduled transmission begins. It should be noted that the transmissions that have been delayed by the quietening process are transmitted with different CRC masks thus enabling the central server to distinguish rescheduled transmissions from regularly scheduled transmissions.

During scheduled transmissions, the central server can respond to each transmission with an acknowledgement and a power setting level. As there can be a correlation between the purposes of these values (i.e., low power is more likely to lead to failed communications and a NACK), the values can be interpreted as a pair when deriving power changes. For example, the following table provides an exemplary correlation between acknowledgement and power setting level.

| Case | Acknowledgement | Power Control Level | Action for Next Transmission (dB) | Nominal Power Change (dB) |
|---|---|---|---|---|
| 1 | ACK | −1 | Lower power by P-am | −0.5 |
| 2 | NACK | −1 | Raise power by P-nm | +1.0 |
| 3 | ACK | +1 | Raise power by P-ap | +1.5 |
| 4 | NACK | +1 | Raise power by P-np | +2.0 |

The actual power level changes can be controlled via system information or by terminal specific reconfiguration.

A power control correction signal could be transmitted within a range relative to a pilot signal (e.g., if the pilot signal amplitude is +10 units, the power control correction signal amplitude can vary in one dimension of a base-band vector representation such as between −1 unit and +1 unit as shown by 906 in FIG. 9). The power control correction signal may be transmitted with a level anywhere in this range, indicating different requested changes to the satellite terminal's transmit power. The power changes in the above table could be scaled by the level of the power control correction signal. That is, control scaling could be analog. This approach is possible due to the presence of the pilot signal, which enables calibration signal levels.

Error rates for acknowledgements should be lower than those for the message payload. For power control, on the other hand, high error rates are typically more tolerable, as (for example) any reception of a NACK can cause an increase in subsequent transmit power levels, irrespective of the received Power Control level. In exemplary implementations, the energy associated with transmitting a NACK might be 8 dB lower than traffic energy, while that for Power Control might be 23 dB lower than traffic energy.

In summary, the key features of a scheduled transmission (for the most common scenario in which no errors occur) are:
  A message with no overhead (i.e., all payload bits are application-related) is transmitted,
  No energy is used sending the ACK,
  Power setting for future transmissions (if transmitted) is sent at a low power level.

Assuming 1% FER, and that Power Setting levels are transmitted, the average power transmitted in the forward link responding to each scheduled transmission could be ~1.1% of that of a forward link traffic burst.

The link margin of the forward link can be increased by raising the power transmitted at the satellite. At the same time, satellite power is a precious resource. By occasionally transmitting BCCH bursts at higher power levels, a trade between satellite power and/or link margin, and delay can be provided. As a satellite tends to be limited by the total instantaneous transmit power, it is typically advantageous to cycle the increase in power from beam to beam. For example, by arranging beams in groups of 16, the BCCH power could be increased in each beam for 1-out-of-16 BCCH bursts. By identifying the pattern of higher power BCCH bursts to the satellite terminals via system information, those terminals can target their reception to the higher power bursts for cases when they note that their receivers are operating at or below threshold signal-to-noise ratio. This same capability can be applied to lower average satellite power while still maintaining nominal link margin.

In some circumstances, a satellite terminal may not be able to detect the forward link signals, such as when the satellite is shadowed. If, at the same time, a terminal user requests an emergency alarm, the satellite terminal may be able to transmit a related emergency message. If GPS timing is available, the satellite terminal may use this as a basis for synchronizing its transmitter. If not, the terminal may transmit with synchronization based on its local reference oscillator. In this case, consideration shall be given to the potential frequency error, and how it might impact neighboring channels or how it might impact compliance with any regulatory requirements. Emergency transmissions may include information such as the identity of the satellite terminal and its location. These transmissions may be repeated at times defined for each terminal. The time between repetitions is known to the central server, which may attempt to combine multiple transmissions to reduce the error rate and thus identify the satellite terminal and its location.

In some circumstances, a satellite terminal's location may be of interest, under conditions in which the satellite terminal is unable to successfully transmit. For example, after a valuable item with an attached satellite terminal has been stolen, operators at the central server may invoke an emergency page. The hub can be aware of the paging reception time of a satellite terminal. Prior to reception, the satellite terminal can wake up and attempt to acquire the forward link channels. During the time the satellite terminal is attempting acquisition, the forward link signal levels may be raised to increase the link margin for both acquisition and the page. Once the satellite terminal receives the page, it can respond by transmitting a complete burst with known content at the maximum power level. This can be followed by a separate burst containing the terminal's location. The operators may also suspend other traffic in the return link during the time the satellite terminal is transmitting. This may increase the probability that the satellite terminal can be contacted and will respond.

Satellite terminals may switch between networks, which may be provided by different satellite operators, to provide, among other things, continuity of service in the event of a satellite failure. Support for this flexibility may arise in the satellite terminal implementation, such as, for example, carrier frequency flexibility, and in the system information, which may include definitions of existing networks as well as parameters enabling future networks to be defined. In situations in which a satellite terminal is covered by multiple networks, the central server may direct satellite terminals to a specific network. The system information may include information related to multiple network operation centers such as frequencies, chip rates, filter characteristics, etc. The satellite terminals may be configured with prioritized network preferences and/or the central server may be configured to redirect satellite terminals to different networks. As new networks come into existence, the system information may be updated to describe these new networks.

System Information (SI) can be a set of parameter values that are broadcast from a Hub to all terminals in a beam. In typical systems, SI can be arranged in a number of classes, enabling efficient management of transmission of the information. For example, information that changes rarely, such as descriptions of space relays, can be placed in a class with other rarely changing information. The priority, and likelihood that parameters will change, can drive the duty cycle at which each class of SI is transmitted. Particular SI parameters may be repeated in every BCCH burst, and some may not be repeated for many BCCH bursts. Some information may change at any time, and should be read before a terminal transmits, e.g., flags that can disable transmission. A terminal that is about to transmit should read these flags, but may not be required to learn of all the available space relays that are available. In another scenario, a newly registering terminal may go through the process of reading all the SI, including descriptions of space relays.

Figure 16:
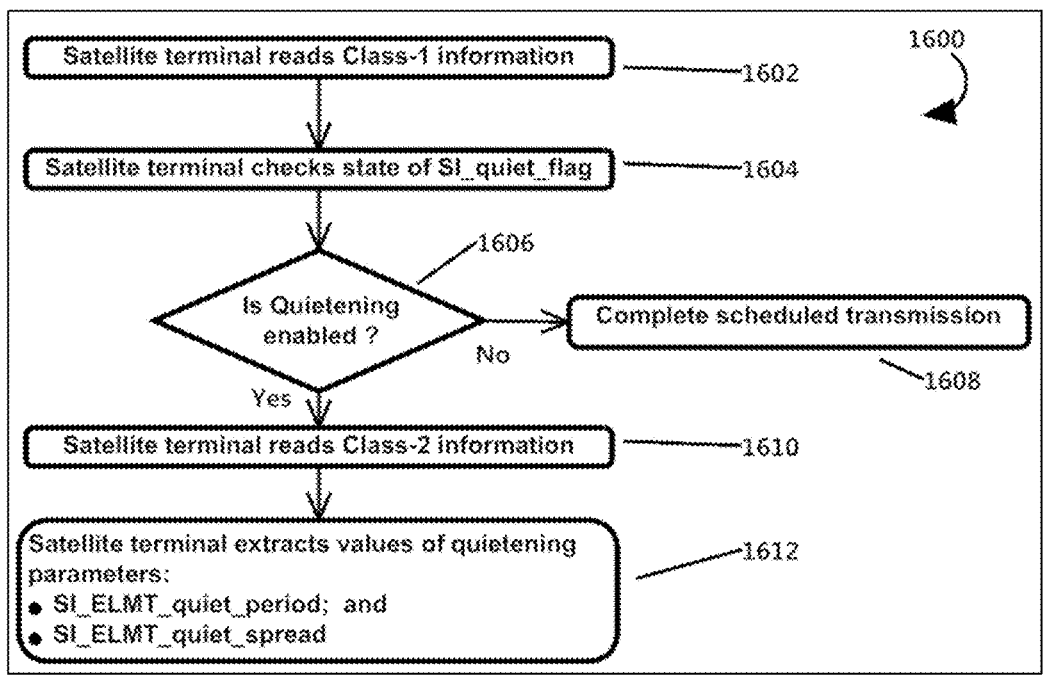
FIG. 16 is a flow chart illustrating a terminal reading system information according to one embodiment of the subject invention.

The System Information associated with scheduled transmission quietening can provide an exemplary case. In FIG. 11, a terminal reads quietening parameters from the System Information 1106 and 1112. FIG. 16 shows this process in more detail, where the quietening parameters are:
  SI_quiet_flag; a 1-bit value in Class-1 System Information
  SI_ELMT_quiet_period; a 4-bit value in Class-2 System Information SI_ELMT_quiet_spread; a 1-bit value in Class-2 System Information In preparation for a scheduled transmission, the terminal can read the Class-1 information 1602, which can be included in every BCCH burst. From the Class-1 information, the terminal can learn the value of the SI_quiet_flag (i.e., that quietening is requested). Given this information, the terminal can be aware (a) that there will likely be a significant delay before the transmission occurs, and (b) that it should read Class-2 information to determine the parameter settings for the quietening. The terminal, therefore, can proceed with reception of the Class-2 information 1610 and with determination of the values of SI_ELMT_quiet_period and SI_ELMT_quiet_spread 1612. Note that the assignment of these parameters to Class-2 can be enabled by the available time for reading the content. In general, parameters can be assigned to the highest class number that enables the desired related operation.

Embodiments of the invention can also be configured with security features such as authentication of each satellite terminal by the central server during registration, authentication of the central server by the satellite terminals during registration, and/or ciphering of data transferred between the satellite terminals and the central server to name a few. In one embodiment, these security features can be implemented using a set of non-public keys that are stored at each satellite terminal and the central server. Compromise of the secret keys stored in a particular terminal would only impact that satellite terminal. In other words, the keys stored in a particular terminal do not provide information related to other satellite terminals. Means for identification of anomalous behavior by potentially-compromised terminals may be applied. For example, transmission from distant locations by multiple terminals with the same identity could be flagged as a potential security threat.

Unlike in conventional systems, the security related processing in embodiments of the invention occurs at the central server rather than at the hub. This approach provides enhanced security as secret keys need not be moved to hub facilities and the list of temporary and permanent secret keys for all satellite terminals can be maintained in one location. As embodiments of a system according to the present invention can be implicitly aware of the identity of every satellite terminal and all communications can pass through a single point and can be associated with specific owners, the motivation for compromising the system is inherently less than conventional systems.

Transmissions by satellite terminals can be prevented by the central server via the system information. In this way, it is possible to manage system resources, such as power and bandwidth, when a space relay approaches capacity. These controls typically apply at the time they are read by the satellite terminals. In other words, a satellite terminal must read the system information within a specified period prior to transmission. Individual transmissions may be prevented based on a variety of things such as terminal class and/or communication mode.

In various embodiments of the invention, the maximum length of a most robust burst can be 1,024*128 ($2^{17}$) chips, corresponding to approximately 5.6 seconds at 23.4 kcps, with an information data rate of approximately 20 bps. By using shorter Walsh codes (in factors of 2 steps), higher information data rates can be achieved. For example, rates of 40 bps, 80 bps, 160 bps, 320 bps, etc. can be achieved. The length of bursts can correspondingly be reduced with the information content of each burst remaining fixed. Bursts can be structured to support different data rates. For example, forward broadcast control channels can operate at the most robust data rate. For forward traffic channels and return link channels, bursts, configured during connection establishment can be configured for a factor of $2^N$ increase in data rate. For example, the number of timeslots in the burst can be reduced to $128/2^N$, the number of chips in the Walsh codes can be reduced to $256/2^N$, the length and content of Gold codes can remain unchanged at 1024 chips (a timeslot), and the number of coded bits per timeslot can increase to $4 \times 2^N$. Frame timing can be divided into subframes of length $2^{(17-N)}$. The hub can advertise the data rates of support for RACH, enabling the satellite terminals to select a supported rate. The AGCH can use the same rate as the RACH, but may assign another rate for subsequent communications.

In some situations, satellite terminals in an embodiment of the invention may be aware of Global Navigation Satellite Systems (GNSS). These systems may provide reference timing signals that could be applied as a reference for framing, etc. If satellite terminals are aware that framing is based on GPS timing, the satellite terminal may determine timeslot and burst frame timing, during acquisition, without having to derive it from the received signals. This can reduce the time needed for acquisition and thus reduce power. Terminals that are transmitting without receiving could also use the GNSS timing to transmit in specific timeframes that could be pre-arranged. Additionally, the terminals could use the frequency reference as a basis for reducing the frequency error in their transmission.

In some operating conditions, channels may be shared with legacy services, such as those associated with other mobile satellite application like voice or packet data communication. This mode of operating is typically applied when the traffic volume is light (e.g. early in the deployment of a system or in beams that contain a small terminal population). In one embodiment of the invention, the shared channel can be a control channel in the legacy system, in which the duty cycle of forward link transmissions is approximately 25%-50%. The legacy channels can operate with Signal-to-Noise Ratios that are 25-30 dB above that needed by embodiments of the subject invention. For example, legacy channels can require Ec/No=0 dB to 5 dB, where Ec/No is the ratio of energy in a transmitted chip (or symbol for systems without spreading) to the noise power spectral density. As such, the same forward link channel can be used to simultaneously transmit the legacy signaling and the spread signaling associated with embodiments of the subject invention. If needed, the power used for transmission of the legacy signals can be increased (typically by a small factor) to maintain the performance of the legacy system. Reception, in the forward link, of bursts associated with embodiments of the invention can be achieved if the level relative to the legacy transmissions provides sufficient Signal-to-Noise Ratio, (i.e. Ec/(Io+No) where Io is the interference power spectral density associated with the legacy waveforms. In the return link, the legacy system can use RACH transmissions with low duty cycles. The transmissions associated with embodiments of the invention can also be transmitted with low duty cycle. Transmissions associated with embodiments of the invention will typically have lower power than the legacy RACH transmissions, so they can have a low impact on the RACH error rate. As the legacy RACH transmissions have low duty cycle, relatively short burst lengths, and power levels that don't necessarily prevent reception, transmissions associated with embodiment of the invention can have reliable performance. As the performance of the links can be different during periods when the channel is shared with legacy services, operation may be improved if the terminals are aware they are transmitting on shared channels. The broadcast system information can be used to inform the terminals that they are operating on shared channels.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in a computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various embodiments may comprise a computer-readable medium including computer executable instructions which, when executed by a processor, cause an apparatus to perform the methods and processes described herein.

As used herein, the term module can describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality. Where components or modules of the invention are implemented in whole or in part using software, in one embodiment, these software elements can be implemented to operate with a computing or processing module capable of carrying out the functionality described with respect thereto.

Furthermore, embodiments of the present invention may be implemented in software, hardware, application logic or a combination of software, hardware and application logic. The software, application logic and/or hardware may reside on a client device, a server or a network component. If desired, part of the software, application logic and/or hardware may reside on a client device, part of the software, application logic and/or hardware may reside on a server, and part of the software, application logic and/or hardware may reside on a network component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. In one embodiment, the computer-readable storage medium is a non-transitory storage medium.

What is claimed is:

1. A communication terminal suitable for sending burst messages to network infrastructure in a communication system, the network infrastructure having a receiver, the terminal comprising:
a transmitter configured to transmit the burst messages to the network infrastructure, the burst messages including a pilot waveform;
the pilot waveform comprising a series of repeated short sequences arranged such that an in-phase correlation peak has significantly higher magnitude than out-of-phase correlation peaks at the receiver of the network infrastructure.

2. The communication terminal of claim 1, wherein the in-phase correlation peak is at least 8 dB higher than the out-of-phase correlation peaks.

3. The communication terminal of claim 2, wherein the in-phase correlation peak is at least 12 dB higher than the out-of-phase correlation peaks.

4. The communication terminal of claim 1, wherein the pilot waveform includes time spacing between the repeated short sequences.

5. The communication terminal of claim 4, wherein a length of time of the time spacing between the repeated short sequences increases for each subsequent set of repeated short sequences.

6. The communication terminal of claim 4, wherein the length of time of the time spacing between the repeated short sequences increases for each subsequent set of repeated short sequences for a first half of the pilot waveform and decreases for each subsequent set of repeated short sequences for a second half of the pilot waveform.

7. The communication terminal of claim 4, wherein no energy is transmitted in the time spacing between the repeated short sequences.

8. The communication terminal of claim 4, wherein non-integer offsets are transmitted in the time spacing between the repeated short sequences.

9. The communication terminal of claim 4, wherein a length of the pilot waveform with time spacing is truncated to equal a length of the pilot waveform without time spacing and gaps between the repeated short sequences created by the time spacing are back-filled with short sequences which are truncated from the pilot waveform with time spacing.

10. The communication terminal of claim 1, wherein the pilot waveform includes phase inversion of the repeated short sequences.

11. The communication terminal of claim 10, wherein the phase inversion is set in 180 degree steps.

12. The communication terminal of claim 10, wherein the phase inversion is set in 90 degree steps.

13. The communication terminal of claim 1, wherein the pilot waveform includes time spacing between the repeated short sequences and phase inversion of the repeated short sequences.

14. A gateway in network infrastructure operating in a communication system, the gateway suitable for receiving burst messages from a communication terminal through the communication system, the gateway comprising:
a receiver configured to receive the burst messages from the communication terminal, the burst messages including a pilot waveform;
the pilot waveform comprising a series of repeated short sequences arranged in a manner such that an in-phase correlation peak has significantly higher magnitude than out-of-phase peaks at the receiver of the gateway.

15. The gateway of claim 14, wherein the in-phase correlation peak is at least 8 dB higher than the out-of-phase correlation peaks.

16. The gateway of claim 15, wherein the in-phase correlation peak is at least 12 dB higher than the out-of-phase correlation peaks.

17. The gateway of claim 14, wherein the pilot waveform includes time spacing between the repeated short sequences.

18. The gateway of claim 17, wherein a length of time of the time spacing between the repeated short sequences increases for each subsequent set of repeated short sequences.

19. The gateway of claim 17, wherein the length of time of the time spacing between the repeated short sequences increases for each subsequent set of repeated short sequences for a first half of the pilot waveform and decreases for each subsequent set of repeated short sequences for a second half of the pilot waveform.

20. The gateway of claim 17, wherein no energy is received in the time spacing between the repeated short sequences.

21. The gateway of claim 17, wherein non-integer offsets are received in the time spacing between the repeated short sequences.

22. The gateway of claim 17, wherein a length of the pilot waveform with time spacing is truncated to equal a length of the pilot waveform without time spacing and gaps between the repeated short sequences created by the time spacing are back-filled with short sequences which are truncated from the pilot waveform with time spacing.

23. The gateway of claim 14, wherein the pilot waveform includes phase inversion of the repeated short sequences.

24. The gateway of claim 23, wherein the phase inversion is set in 180 degree steps.

25. The gateway of claim 23, wherein the phase inversion is set in 90 degree steps.

26. The gateway of claim 14, wherein the pilot waveform includes time spacing between the repeated short sequences and phase inversion of the repeated short sequences.

* * * * *